(12) United States Patent
Grossmann et al.

(10) Patent No.: US 8,087,332 B2
(45) Date of Patent: Jan. 3, 2012

(54) LATHE

(75) Inventors: Walter Grossmann, Baltmannsweiler (DE); Bernd Walker, Esslingen (DE)

(73) Assignee: Index-Werke GmbH & Co. KG Hahn & Tessky, Esslingen (DE)

( * ) Notice: Subject to any disclaimer, the term of this patent is extended or adjusted under 35 U.S.C. 154(b) by 0 days.

(21) Appl. No.: 12/719,314

(22) Filed: Mar. 8, 2010

(65) Prior Publication Data

US 2010/0263502 A1 Oct. 21, 2010

Related U.S. Application Data

(63) Continuation of application No. PCT/EP2008/060980, filed on Aug. 21, 2008.

(30) Foreign Application Priority Data

Sep. 11, 2007 (DE) .......................... 10 2007 044 457

(51) Int. Cl.
  *B23B 3/00* (2006.01)
  *B23B 13/00* (2006.01)
(52) U.S. Cl. ........................................... 82/121; 82/123
(58) Field of Classification Search ..................... 82/121, 82/123, 129, 137, 142; 29/27 C, 50, 54
See application file for complete search history.

(56) References Cited

U.S. PATENT DOCUMENTS

| 5,239,901 A  * | 8/1993 | Lin ................................ 82/119 |
| 6,279,438 B1 * | 8/2001 | Delacou .......................... 82/121 |
| 6,842,954 B2 * | 1/2005 | Ronneberger .................... 29/50 |
| 7,267,035 B2 * | 9/2007 | Uebelhart ....................... 82/121 |

FOREIGN PATENT DOCUMENTS

| DE | 1913377 A1 | 9/1970 |
| EP | 1380371 A1 | 1/2004 |
| FR | 2758488 A1 | 7/1998 |

\* cited by examiner

*Primary Examiner* — Will Fridie, Jr.
(74) *Attorney, Agent, or Firm* — Reinhart Boerner Van Deuren P.C.

(57) ABSTRACT

In order to improve a lathe comprising a machine frame, a spindle housing which is arranged on the machine frame and in which a workpiece spindle rotatable about a spindle axis is arranged, as well as at least one functional unit designed as a tool carrier and/or as a workpiece transport device in such a manner that as efficient a machining as possible of the workpiece is possible, it is suggested that the spindle housing be designed as an upright housing member, that the upright housing member be arranged on one side of a working space and border on it and that several functional units be arranged on the upright housing member.

20 Claims, 21 Drawing Sheets

LATHE

This application is a continuation of International application No. PCT/EP2008/060980 filed on Aug. 21, 2008.

This patent application claims the benefit of International application No. PCT/EP2008/060980 of Aug. 21, 2008 and German application No. 10 2007 044 457.7 of Sep. 11, 2007, the teachings and disclosure of which are hereby incorporated in their entirety by reference thereto.

The invention relates to a lathe comprising a machine frame, a spindle housing which is arranged on the machine frame and in which a workpiece spindle is arranged which is rotatable about a spindle axis as well as at least one functional unit designed as a tool carrier and/or workpiece transport device.

Lathes of this type are known from the state of the art.

In their case, the functional unit is normally arranged independently on the machine frame and is movable relative to the workpiece spindle and to the spindle housing in order to machine a workpiece accommodated in the workpiece spindle.

The object underlying the invention is to improve a lathe of the generic type in such a manner that as efficient a machining as possible of the workpiece is possible.

This object is accomplished in accordance with the invention, in a lathe of the type described at the outset, in that the spindle housing is designed as an upright housing member, that the upright housing member is arranged on one side of a working space and borders on it and that several functional units are arranged on the upright housing member.

The advantage of the solution according to the invention is to be seen in the fact that as a result of the design of the spindle housing as an upright housing member and the arrangement of functional units on the upright housing member, a machine structure has been created which is simple to construct, on the one hand, has great stability and, on the other hand, offers the possibility in a simple manner of providing several functional units.

With respect to the design of the upright housing member itself, the most varied of solutions are conceivable. For example, it is conceivable to arrange the upright housing member together with the workpiece spindle so as to be movable relative to the machine frame.

In a simple and inexpensive solution, it is, however, preferably provided for the upright housing member to be arranged stationarily on the machine frame.

In addition, it is expediently provided for the upright housing member to be designed as an upright housing block which is arranged on an underframe of the machine frame, rises, in particular, above the underframe and is connected, in particular, securely to the underframe so that a lathe which is of a simple construction and space-saving design can be produced.

It is particularly favorable when the workpiece spindle comprises a spindle motor, the stator of which is held in the upright housing member.

In this respect, the stator could, in particular, be arranged so as to be movable relative to the upright housing member.

With respect to the construction of the unit consisting of workpiece spindle and upright housing member, it is particularly favorable when the stator is held stationarily on the upright housing member.

No further details have been given in conjunction with the preceding explanations concerning the solution according to the invention with respect to the extension of the upright housing member transversely to the spindle axis.

It is, for example, favorable when the upright housing member has an extension transversely to the spindle axis which corresponds to at least a diameter of the spindle motor transversely to the spindle axis and proceeding from it and so the upright housing member has an extension over and beyond the workpiece spindle which corresponds to at least a radius of the spindle motor.

Another definition of the extension of the upright housing member provides for the upright housing member to have an extension transversely to the spindle axis which corresponds to at least half an extension of the working space in this direction.

It is particularly favorable when the upright housing member extends transversely to the spindle axis at least as far as receptacles for the functional units, is, in particular, designed to enclose the receptacles for the functional units.

In principle, the several functional units could be arranged on the upright housing member in any optional manner.

One particularly favorable and efficient arrangement of the functional units provides for the several functional units to be arranged around the spindle axis on the upright housing member.

This does not, however, require the functional units to be arranged so as to enclose the spindle axis.

For example, it is sufficient for achieving the advantages of the solution according to the invention when the several functional units are arranged around the spindle axis in an arc segment which extends over an angular area of at least 90°.

It is, however, even better when the several functional units are arranged around the spindle axis in an arc segment which extends over an angular area of at least 120°.

A solution is even more advantageous, with which the several functional units are arranged around the spindle axis in an arc segment which extends over an angular area of at least 180°.

Particularly advantageous solutions even provide for the several functional units to be arranged around the spindle axis in an arc segment which extends over an angular area of at least 240°.

Alternatively or in addition to the solution described above, one additional, advantageous solution to the object specified at the outset provides for the spindle housing to be designed as an upright housing member and for at least two functional units, which have functional elements which are movable relative to the workpiece spindle and displaceable on respective functional paths, to be arranged on the upright housing member.

The advantage of the solution according to the invention is to be seen in the fact that as a result of the two functional paths which are different from one another the possibility is created of using the functional units independently of one another and therefore, where applicable, in a manner overlapping as to time or even simultaneously.

Machining of a workpiece may be carried out with a lathe according to the invention even more efficiently when at least three functional units are provided on the upright housing member and these units have functional elements which are movable relative to the workpiece spindle and displaceable on respective functional paths.

It is even better when at least four functional units are provided on the upright housing member in a lathe according to the invention and these units have functional elements which are movable relative to the workpiece spindle and displaceable on respective functional paths.

One particularly favorable solution provides for the functional elements to be movable on functional paths which are respectively different from one another.

In this respect, the functional paths have, in particular, a component which extends transversely to the spindle axis.

In order to obtain as far-reaching an independability as possible during the movement of the functional elements, it is preferably provided for the functional paths of at least some of the functional elements to extend relative to one another without crossing.

It is even better when the functional paths of all the functional elements extend relative to one another without crossing.

Furthermore, it is favorable when the functional paths of at least some of the functional elements extend relative to one another without touching.

In this respect, it is even better when the functional paths of all the functional elements extend relative to one another without touching.

A further, advantageous embodiment provides for some of the functional paths to be realizable with a component which extends transversely, in particular radially, to the spindle axis so that the functional paths can be guided to the workpiece in a simple manner.

It is particularly favorable when all the functional paths can be realized with a component which extends transversely, in particular radially, to the spindle axis.

Furthermore, it is favorable for an efficient lathe machining when some of the functional paths can be realized with a component which extends approximately parallel to the spindle axis.

It is even better when all the functional paths can be realized with a component which extends approximately parallel to the spindle axis.

It is particularly favorable for carrying out machining of workpieces in the workpiece spindle when at least some of the functional elements are arranged so as to be movable independently of one another so that the functional elements can be used efficiently, as a result.

It is particularly favorable when functional elements, which are designed as tools, of different functional units which are designed as tool carriers are arranged so as to be mechanically movable independently of one another so that the tools can expediently be used independently of one another.

The use of the tools is even more advantageous when the tools can be moved only on functional paths which allow a collision-free movement of the tools relative to one another. In this case, it is not necessary to take the freedom from collisions of the movements of the tools into account during the programming of the machine since this results solely from the mechanical concept.

It is even more advantageous when the tools can be moved only on functional paths which allow a collision-free movement of the tools relative to the machine frame so that possible collisions with the machine frame need also not be taken into account during the programming of the tools.

It is particularly advantageous with this solution when, as a result, the possibility exists of using the respective tools at the same time and, therefore, of configuring the machining of the workpieces with optimum efficiency.

With respect to the functional units provided on the upright housing member, no conclusive statements have so far been made.

One particularly favorable solution, for example, provides for all the functional units which are provided for machining workpieces in the working space to be arranged on the upright housing member and so there is no necessity whatsoever to arrange or support additional functional units at other locations of the machine frame.

With respect to the concrete design of the individual functional units, no further details have likewise been given thus far.

One advantageous solution, for example, provides for functional units with functional elements which can be moved approximately parallel to the spindle axis to have guiding members which extend approximately parallel to the spindle axis and are guided in a guide for the guide members which is provided in the upright housing member so as to be movable approximately parallel to the spindle axis. This solution is simple, on the one hand, and, on the other hand, has great stability.

In this respect, it is expediently provided for a drive for the movement of the guiding members to be arranged on the upright housing member so that this drive can be mounted in a simple manner.

In this respect, the drive is, in particular, arranged on a side of the upright housing member which faces away from the working space.

Furthermore, one advantageous solution provides for the functional units with functional elements which can be moved transversely to the spindle axis to have base members which are held on the upright housing member and on which slides, which can be moved transversely to the spindle axis, are guided.

In this respect, it is expediently provided for a drive for the slides to be arranged on the base member and, in particular, on a side facing away from the workpiece spindle.

The concept according to the invention may be realized particularly expediently when the working space is accessible free from parts of the machine frame from a side which is located opposite the upright housing member and so the lathe can be tooled and equipped in a time-saving manner.

In addition, it is advantageous when the working space is accessible free from parts of the machine frame from side areas which extend subsequent to the upright housing member so that, as a result, the accessibility of the working space is optimized.

It is also even more advantageous when the working space is accessible free from parts of the machine frame from an upper side which borders on the upright housing member.

Additional features and advantages are the subject matter of the following description as well as the drawings illustrating several embodiments.

Figure 1:
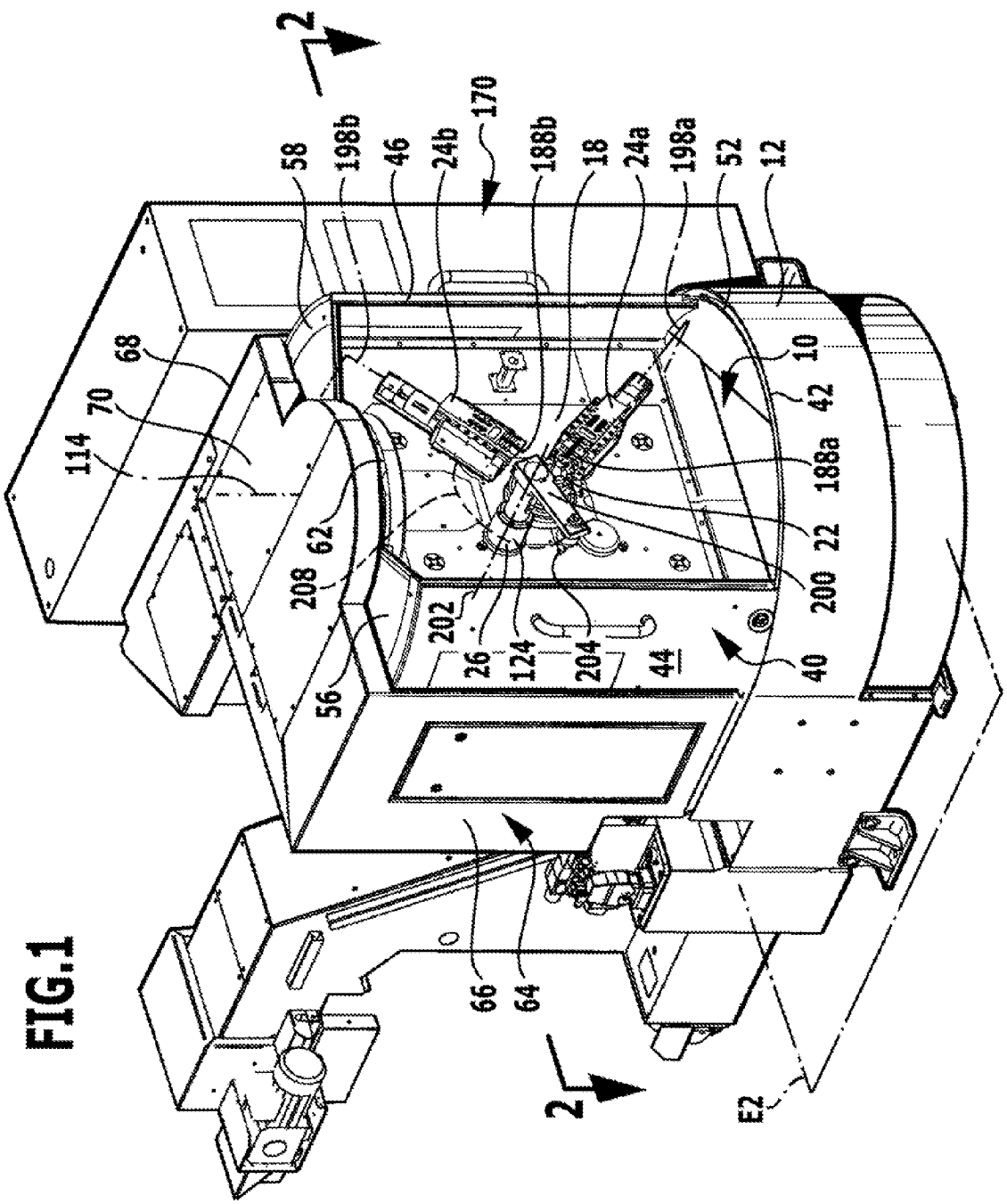
FIG. 1 shows a perspective illustration of a first embodiment of a lathe according to the invention with doors of a machine casing opened.

A first embodiment of a lathe according to the invention, illustrated in FIG. 1, comprises a machine frame 10 with an underframe 12, on which an upright housing member, which is designated as a whole as 18 and forms a housing for a workpiece spindle 22, is arranged.

Moreover, tool carriers 24a, 24b are arranged on the upright housing member 18 as functional units 20 as well as a workpiece transport device 26 which is designed, in this case, as a workpiece handling unit.

Figure 2:
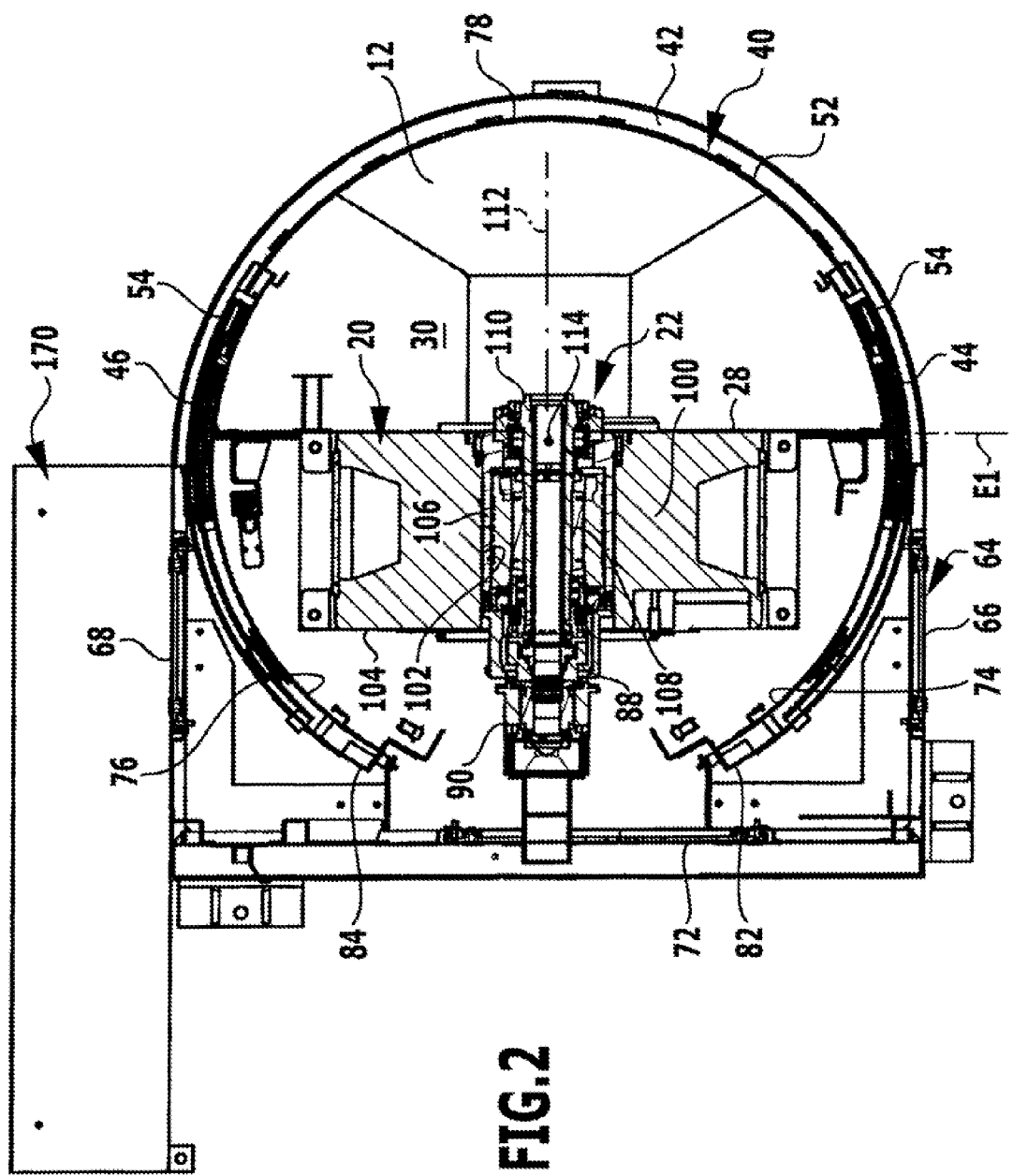
FIG. 2 shows a section in a plane corresponding to line 2-2 in FIG. 1.
Figure 3:
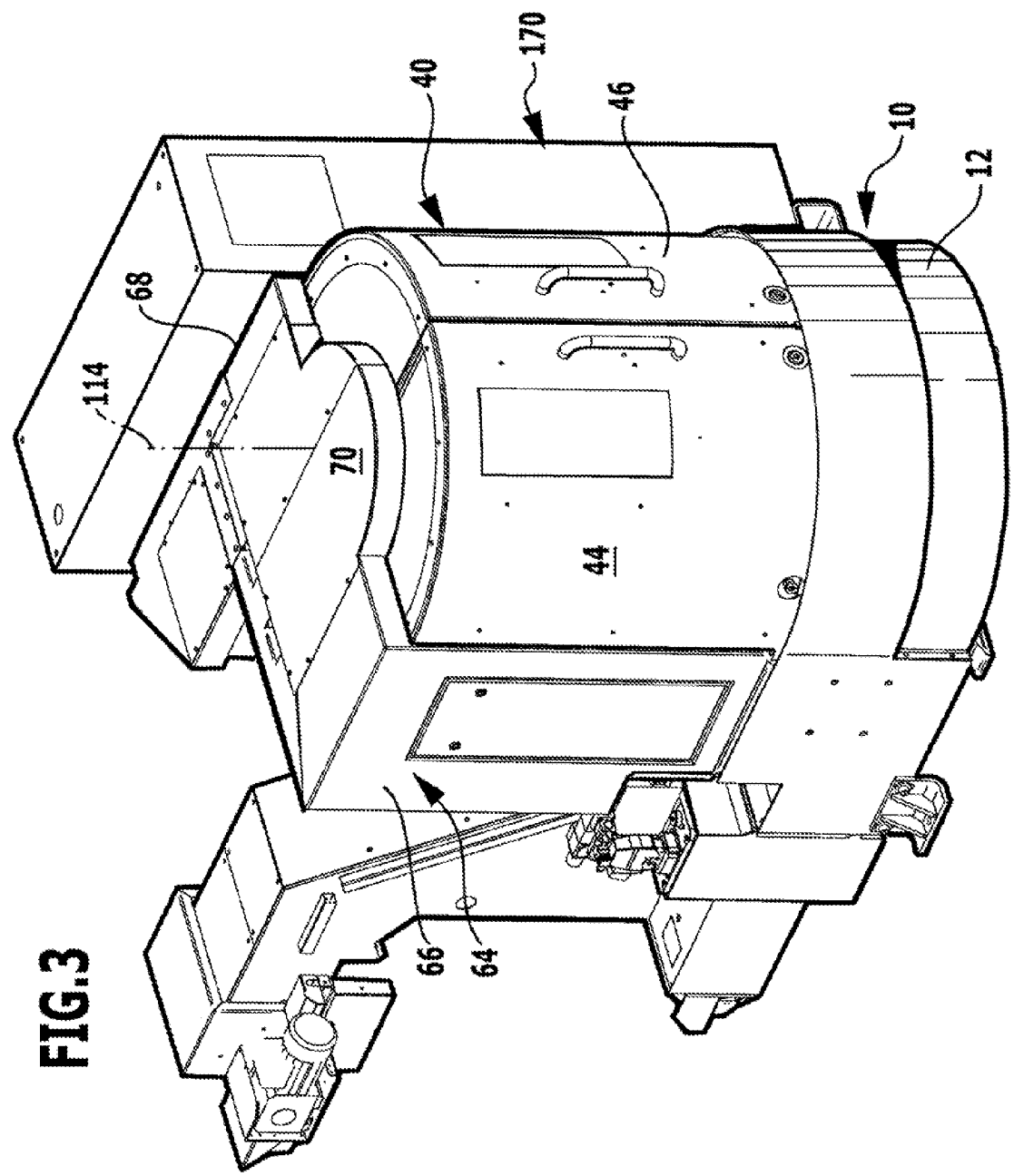
FIG. 3 shows a perspective illustration of the first embodiment of the lathe according to the invention with doors of the machine casing closed.

As illustrated in FIGS. 1 and 2, the upright housing member 18 borders with a front side 28 on a working space 30 which, proceeding from the underframe 12, extends away from it upwards along the front side 28 of the upright housing member 18 and away from it.

The working space 30 is located on one side of a plane E1, in which the front side 28 of the upright housing member 18 also extends and is limited by a machine casing 40 which, proceeding from the plane E1, extends in an arc-like contour 42, wherein the arc-like contour 42 is located in a plane E2 which preferably extends at right angles to the plane E1.

The machine casing which is designated as a whole as 40 comprises two doors 44 and 46 which are adapted to the contour 42 and can be moved along the contour 42, wherein the two doors 44 and 46 are guided in a guide 52 held on the underframe and following the contour 42 and are supported on the guide 52 by guiding elements 54 and so the doors 44 and 46 are borne by the guide 52.

Furthermore, the doors 44 and 46 are guided, in addition, by means of upper parts 56 and 58 in a guide 62 which is arranged securely on a casing housing 64 which is stationarily connected to the underframe 12 and rises above the underframe 12 on a side facing away from the working space 30 subsequent to the plane E1 and, in this respect, encloses the upright housing member 18 on the side facing away from the working space 30 with side parts 66 and 68 as well as an upper part 70 and a rear side 72.

Furthermore, inner sections 74 and 76 of the guide 52, which continue the contour 42 in the casing housing 64, also extend in the casing housing 64 and extend in continuation of an arc, for example, an arc of a circle formed in front of the plane E1, i.e. on a side of the plane E1 facing the working space 30, essentially along an arc forming, for example, the contour 42.

The sections 74 and 76 of the guide 52 are arranged with their ends 82 and 84 preferably at a distance from one another so that, despite doors 44 and 46 which are moved as far as the ends 82 and 84, a free accessible area 86 exists for devices 90 which are arranged on a rear side 88 of the workpiece spindle 22 which is located opposite the working space 30.

As is illustrated, in addition, in FIG. 2, the upright housing member 18 comprises a central area 100, in which a passage 102 is provided which extends from the front side 28 as far as a rear side 104 of the upright housing member 18.

A stator 106 of the workpiece spindle 22, which is designed as a spindle motor and for which the central area 100 of the upright housing member 18 represents a housing, is arranged in the passage 102.

A rotor 108 of the workpiece spindle 22 designed as a spindle motor is mounted within the stator 106 via rotary bearings, a workpiece receptacle 110 for holding a workpiece being provided on the workpiece spindle coaxially to a spindle axis 112 of the workpiece spindle 22, wherein the workpiece can be driven for rotation about the spindle axis 112 with the workpiece spindle 22.

The workpiece spindle 22 is preferably arranged with the upright housing member 18 within the machine casing 40 such that a central axis of the contour 42, for example, a cylinder axis 114 in the case of a cylindrical contour 42, extends transversely to the spindle axis 112 and, for example, intersects it.

Figure 4:
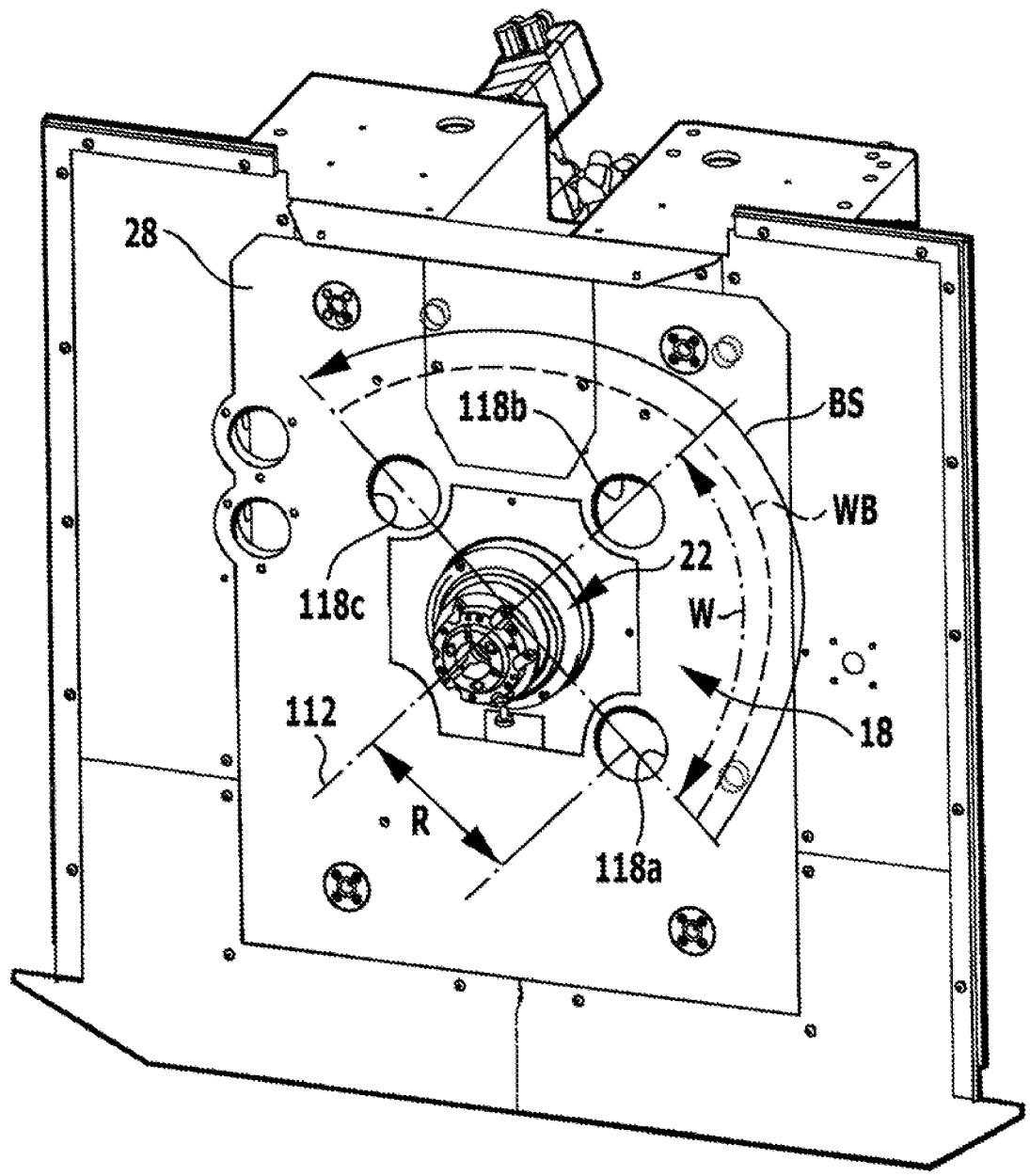
FIG. 4 shows a perspective illustration of a plan view of a front side of an upright housing member with receptacles for functional units provided in the upright housing member.
Figure 5:
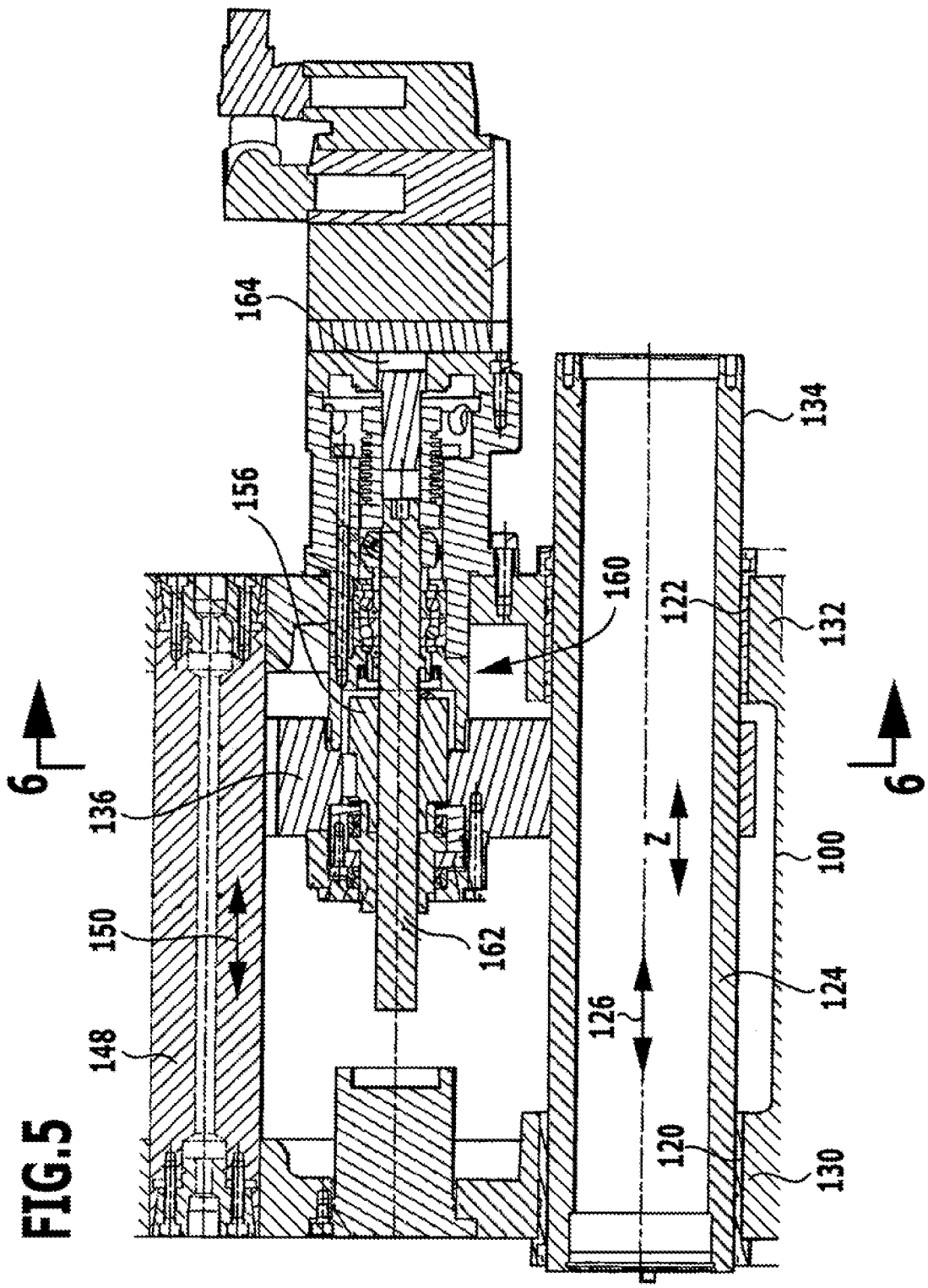
FIG. 5 shows a partial section through the upright housing member in the area of a guiding member for a functional unit.
Figure 6:
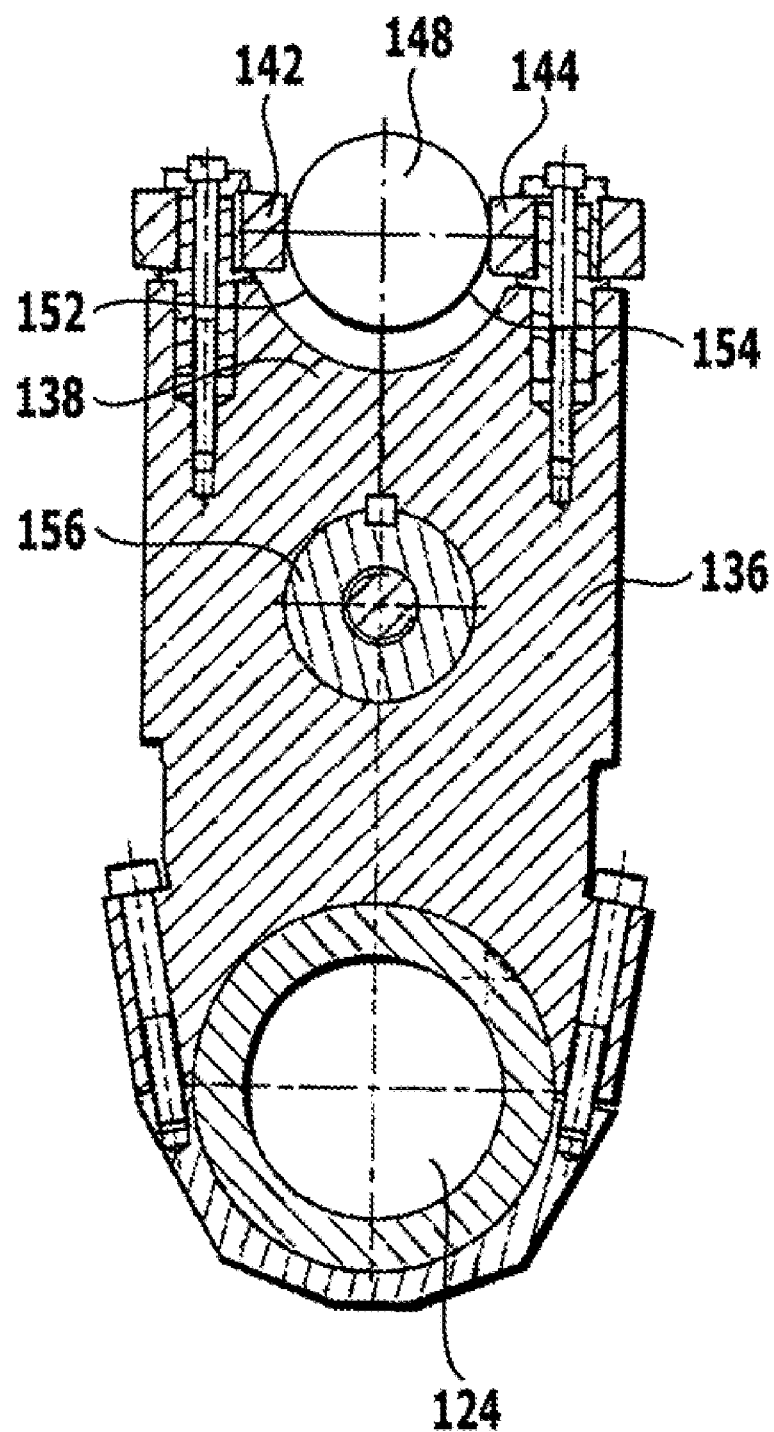
FIG. 6 shows a section along line 6-6 in FIG. 5.

Receptacles 118 for functional units 20 are provided in the upright housing member 18 around the workpiece spindle 22, in particular around the passage 102, as illustrated in FIGS. 4 and 5, and these comprise guide receptacles 120 and 122, in which guiding members 124 are mounted for displacement in guiding directions 126 which preferably extend approximately parallel to the spindle axis 112.

The guide receptacles 120, 122 are each seated in front-side upright housing walls 130 and rear-side upright housing walls 132 of the upright housing member 18 which adjoin the central area 100 and extend away from it.

In the case illustrated, the guiding members 124 are designed as sleeves which are guided on the upright housing member 18 with their cylinder casing surface 134 in the guide receptacles 120, 122 designed as guide bushings so as to be displaceable in the guiding direction 126.

The non-rotatable guidance of the guiding members 124 relative to the upright housing member 18 as well as an advancing movement in the guiding direction 126 are brought about via arms 136 which are located to the side of the guiding members 124, preferably approximately radially to the spindle axis 112, proceeding from the guiding members 124 between the upright housing walls 130 and 132 and which are fixed to the guiding members 124, for example, by way of clamping and have at their end areas 138 facing away from the respective guiding member 124 guiding rollers 142 and 144 which are arranged at a distance from one another and abut on oppositely located sides of a guide carrier 148 which extends parallel to the guiding direction 126 with its longitudinal direction 150 and has contact surfaces 152 and 154 for the guiding rollers 142 and 144 which likewise extend parallel to the guiding direction 126 and at a distance from one another so that the guiding rollers 142, 144 are guided essentially free from clearance transversely to the guide carrier 148 and, therefore, form via the arm 136 a non-rotatable support for the guiding member 124 with respect to any rotary movement about the guiding direction 126.

A spindle nut 156 of a spindle drive designated as a whole as 160 for displacing the arm 136 in guiding direction 126 is also seated in the arm 136, wherein the spindle drive 160 has a drive spindle 162 which passes through the spindle nut 156 and is mounted, for example, in the area of the rear upright housing wall 132 facing away from the front side 28 so as to be rotatable and axially non-displaceable and can be driven by a drive motor 164.

As a result of the drive motor 164, the spindle nut 156 may be displaced together with the arm 136 in a guiding direction 126 via the drive spindle 162 and, therefore, the guiding member 124 can also be displaced in the guiding direction 126 on account of the rigid coupling of the arm 136 to the guiding member 124 and be secured in optional positions in a defined manner.

It is, therefore, possible, as a result of the drive motor 164 being activated by means of a machine control 170, to move the tool carriers 24 or the tool transport device 26 in a direction parallel to the spindle axis 112 and, therefore, in the Z direction and position them exactly.

As illustrated in FIG. 4, three receptacles 118 are provided altogether in the upright housing member 18 in the first embodiment, wherein the receptacles 118a, 118b and 118c are arranged around the spindle axis 112, for example, at the same radial distance R and, in addition, have with respect to the spindle axis 112 an angular distance W from one another which is approximately 90° so that, in the first embodiment, the receptacles 118a, 118b and 118c are located in an arc segment BS and extend altogether over an angular range WB around the spindle axis 112 of approximately 180° and the tool carriers 24a and 24b forming the functional units 20 as well as the workpiece transport device 26 are likewise arranged around the spindle axis 116 in an angular range WB of approximately 180°.

In the case of the tool carriers 24, slide units 180 are provided on the guiding members 124, namely at the front ends 172 thereof, and have a tool slide 182 which is guided on a slide base 186 for displacement in a guiding direction 184.

In addition, a slide drive which is designated as a whole as 190 is provided on the slide base 186 and has a spindle nut 192 which is securely connected to the tool slide 182 and has a drive spindle 194 passing through it which is, for its part, mounted on the slide base 186 so as to be rotatable and axially non-displaceable and can be driven by a drive motor 196 which can likewise be activated by the machine control 170 in order to position the tool slide 182 in the guiding direction 186 in a defined manner which is aligned such that it represents an X direction for machining of a workpiece in the workpiece spindle 22, i.e. the guiding direction 184 extends, in particular, radially to the spindle axis 116.

Figure 7:
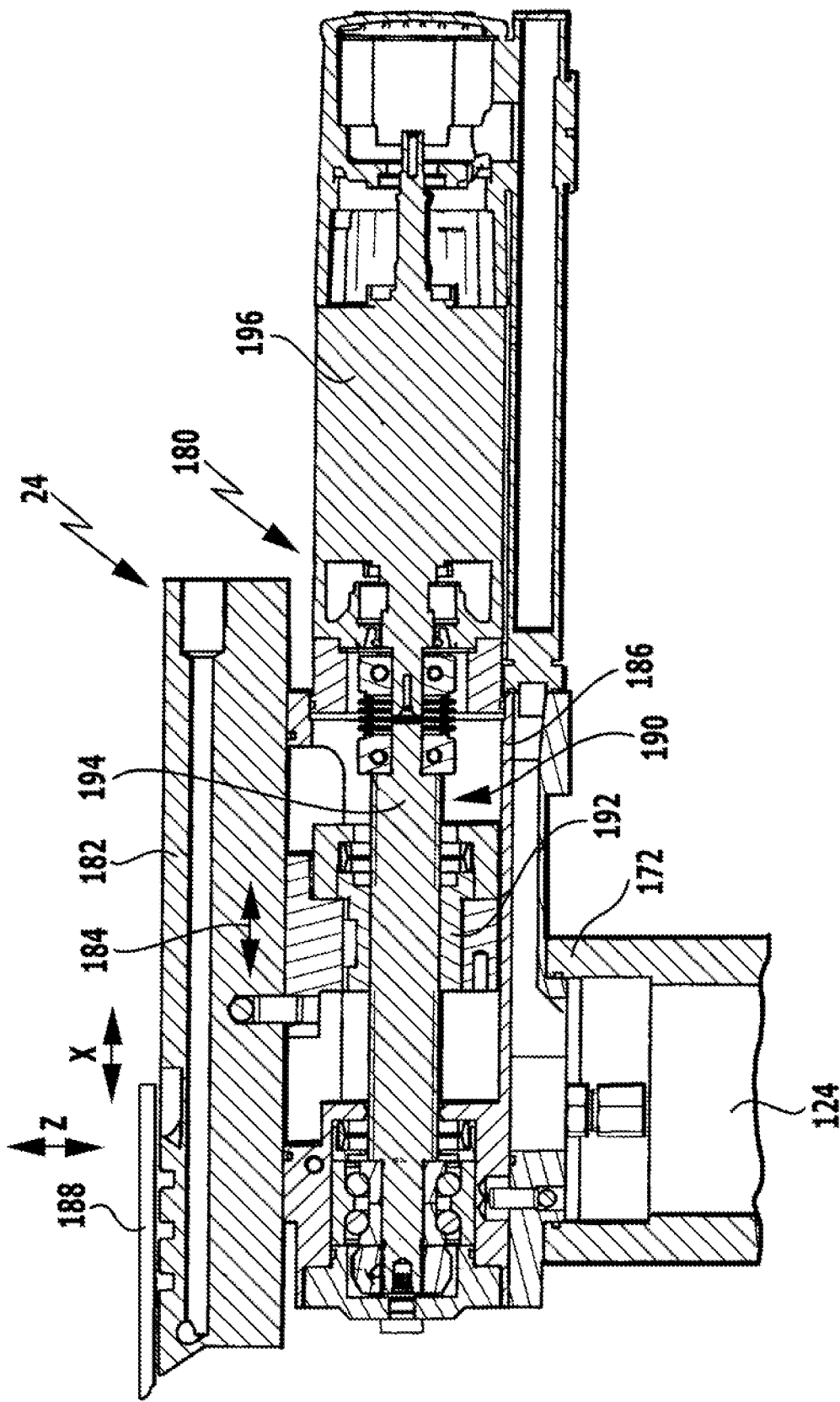
FIG. 7 shows a section through a slide of a functional unit according to the invention.

As a result, a tool 188 mounted on the tool slide 182 can be moved on optional functional paths FW which are located in an X/Z plane 198 which corresponds to the plane of drawing in FIG. 7.

In contrast to the tool carriers 24, the workpiece transport device 26 comprises a pivot arm 200 which is held on the guiding member 124 and pivotable about a pivot axis 202 which extends approximately parallel to the guiding direction 126 and approximately parallel to the spindle axis 112.

Furthermore, the pivot arm 200 is also provided with a workpiece gripping device 204 which is in a position to grip a workpiece and insert it into the workpiece spindle 22, in particular into the workpiece receptacle 110 thereof, or remove it from there.

As a result, the workpiece gripping device 204 can be moved on optional functional paths FG which are located in a cylinder surface 208 which is rotationally symmetric to the pivot axis 202.

A lathe is therefore available, with the lathe according to the invention, with which the working space 30 is accessible in an optimum manner when doors 44, 46 of the machine casing 40 are open, as illustrated in FIG. 1, and which is simple to construct and simple to operate in order to produce, in particular, simple turned parts efficiently, i.e. turned parts, during the production of which fewer different tools are, altogether, required.

As illustrated in FIG. 1, the possible functional paths FWa of the tool 188a are located in the plane 198a whereas the possible functional paths FWb of the tool 188b are located in the plane 198b so that the functional paths FWa and FWb can never touch or intersect one another and the tools 188a and 188b representing functional elements can be moved relative to one another free from collisions.

Furthermore, the workpiece gripping device 204 which represents a functional element can also be moved with all the possible functional paths FG only on the cylinder surface 208 which extends in relation to the planes 198a and 198b without touching and crossing them so that the workpiece gripping device 204 can also be moved free from collisions in relation to the tools 188a and 188b.

As a result, it is possible to move not only the tools 188a and 188b but also the workpiece gripping device 204 on the possible functional paths independently of one another and, therefore, so as to overlap in time or, where applicable, at the same time.

Figure 8:
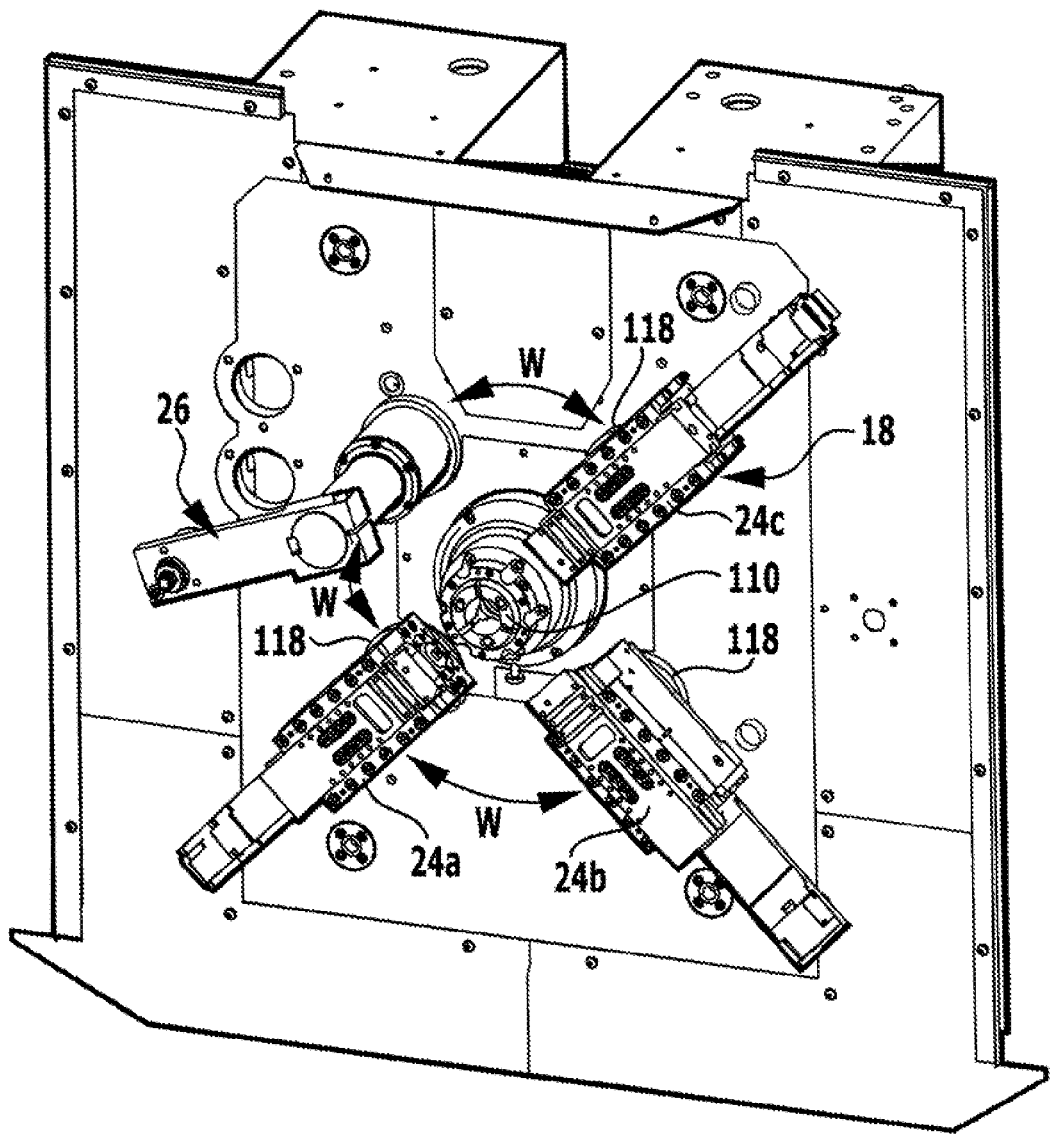
FIG. 8 shows a view similar to FIG. 4 of a second embodiment of a lathe according to the invention with the functional units provided.

In a second embodiment of a lathe according to the invention, illustrated in FIG. 8, three tool carriers 24a, 24b and 24c are provided altogether in the receptacles 118 provided in the upright housing member 18, wherein the tool carriers 24a, 24b and 24c are, for their part, respectively arranged at an angular distance of approximately 90° each time relative to one another.

In addition, the workpiece transport device 26 already described in conjunction with the first embodiment is also provided and is constructed in a similar manner to the first embodiment.

As a result, three tools can, altogether, be used at the same time for the machining of the workpiece from different sides without these tools hindering one another and, furthermore, the workpiece transport device offers a simple possibility for inserting and exchanging the workpiece in the workpiece receptacle 110.

In this embodiment, the workpiece transport device 26 is also arranged at an angular distance W not only away from the tool carrier 24a but also away from the tool carrier 24b and so, altogether, functional units in the form of tool carriers 24 and/or tool transport devices 26 are provided altogether in an angular range of 360° around the spindle axis 112 and they are all mounted on the upright housing member 18 in the manner described in conjunction with the first embodiment.

Figure 9:
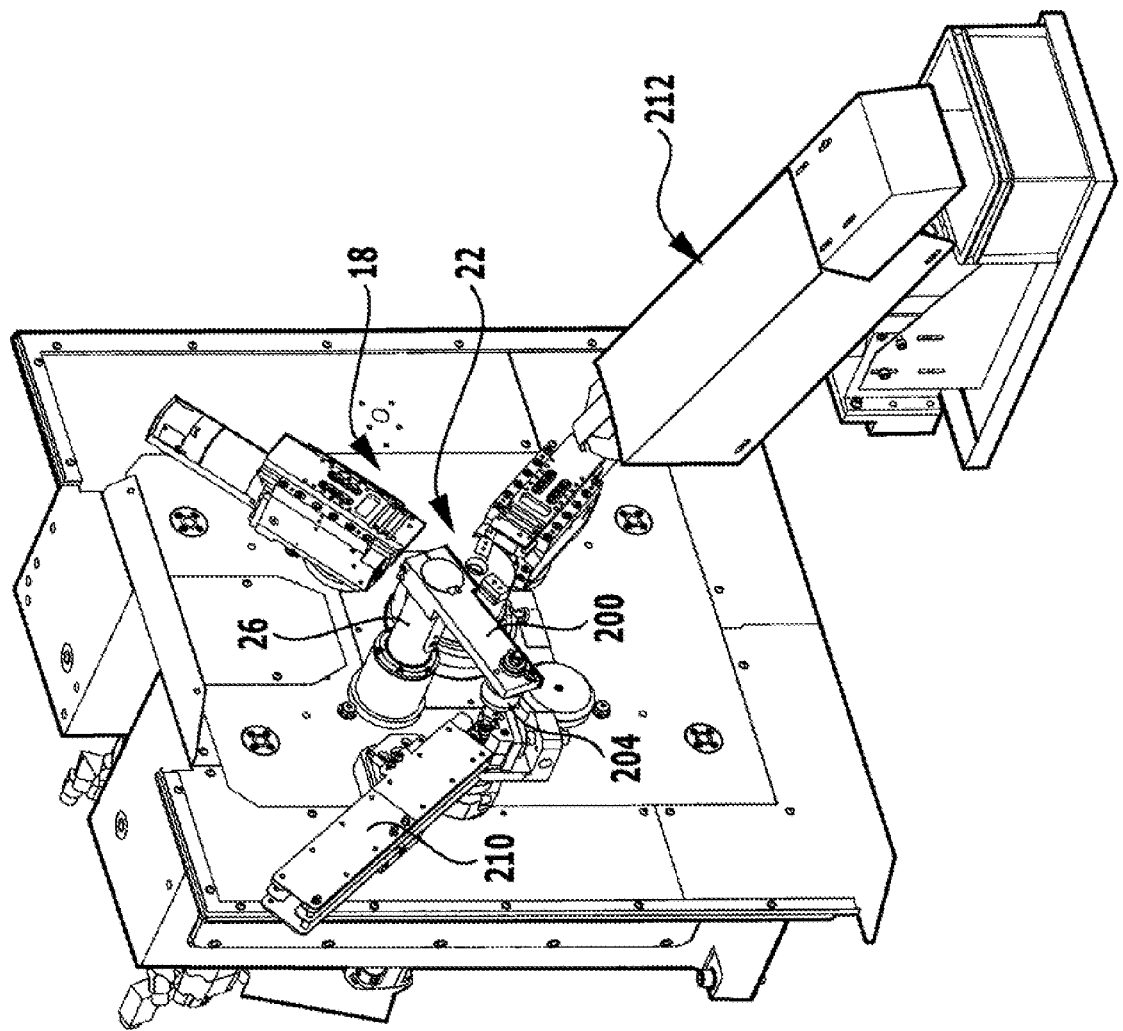
FIG. 9 shows a perspective illustration similar to FIG. 1 of a third embodiment of a lathe according to the invention.
Figure 10:
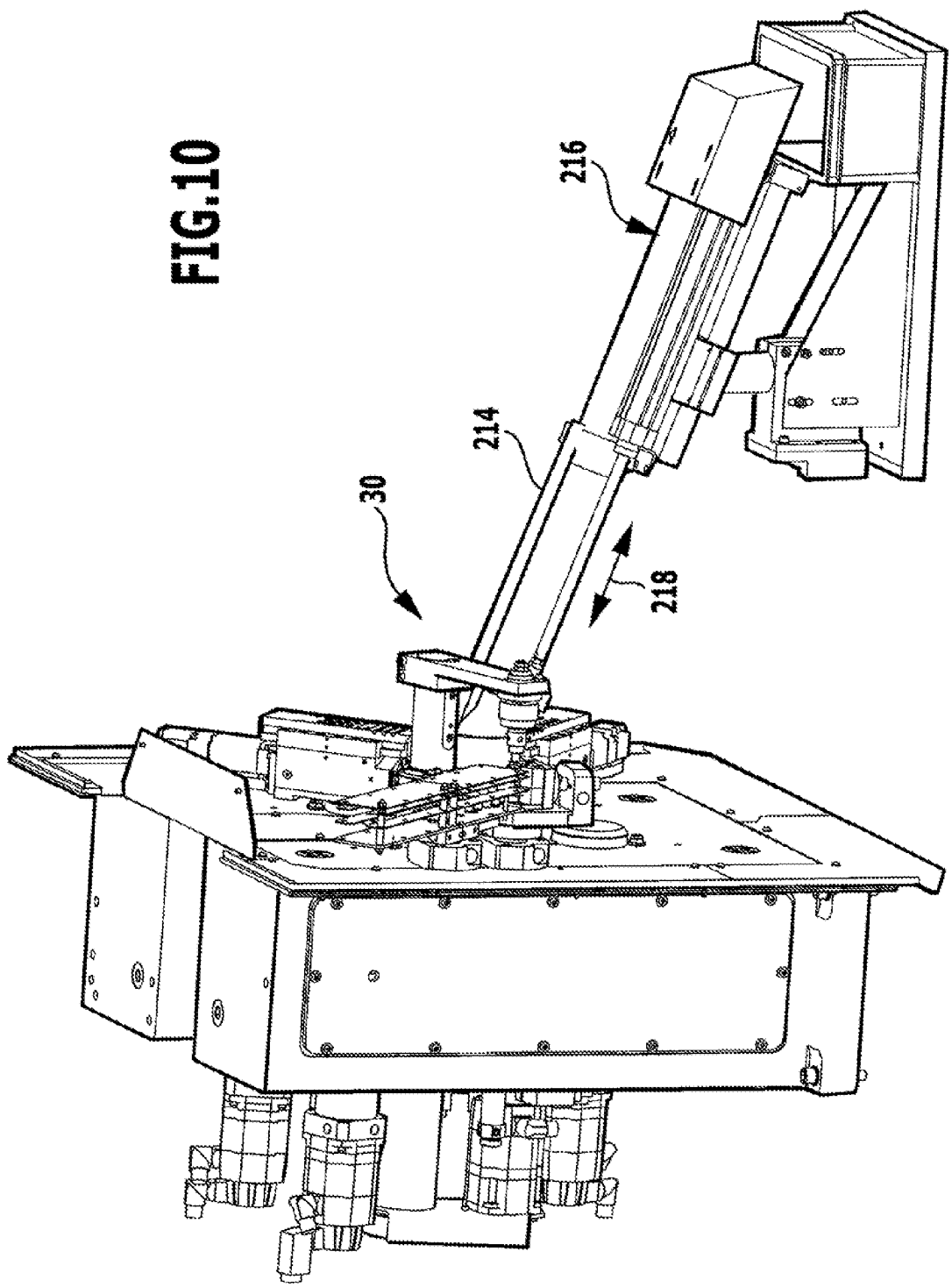
FIG. 10 shows an illustration of the third embodiment of the lathe according to the invention in accordance with FIG. 9 during removal of a workpiece.

In a third embodiment, illustrated in FIGS. 9 and 10, improved possibilities for the workpiece transport are provided. In this case, a supply magazine 210 is associated with the workpiece transport device 26 with the pivot arm 200 and workpieces can be removed from it with the workpiece gripping device 204 and can be inserted into the workpiece spindle 22.

The supply magazine 210 is likewise preferably arranged on the upright housing member 18 and borne by it.

Furthermore, a workpiece removal device 212 is provided for removing the workpieces from the workpiece spindle 22 and this is arranged on the front side of the upright housing member 18 and, as illustrated in FIG. 10, has an extendable removal element 214 which is guided on a base unit 216 so as to be extendable in a direction of extension 218 and will be extended in the direction of the workpiece spindle 22 in the case of a finished workpiece in the workpiece spindle 22 and, in this respect, takes up the finished workpiece from the workpiece spindle 22.

The removal element 214 represents, for example, a removal chute, along which the workpiece can slide through the working space 30.

Figure 11:
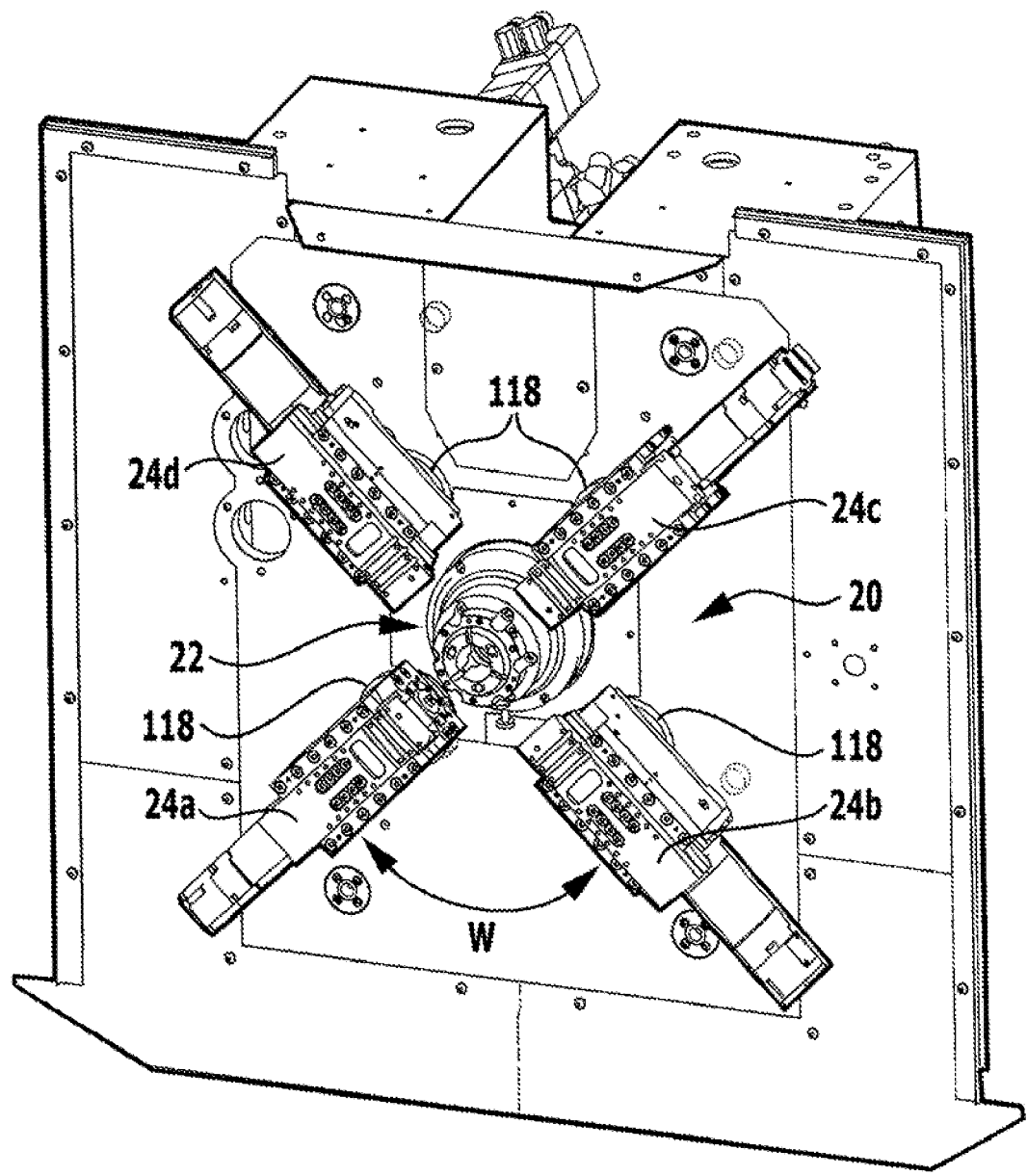
FIG. 11 shows an illustration similar to FIG. 4 of a fourth embodiment of a lathe according to the invention.

In a fourth embodiment, illustrated in FIG. 11, only tool carriers 24 are held in the receptacles 118 and guided by the guiding members 124, wherein the tool carriers 24a to 24d are respectively arranged at angular distances W from one another around the spindle axis 112 and, therefore, functional units in the form of the workpiece carriers 24a to 24d are provided altogether in an angular range of 360° around the spindle axis 112, the tools of these tool carriers being usable at the same time.

Figure 12:
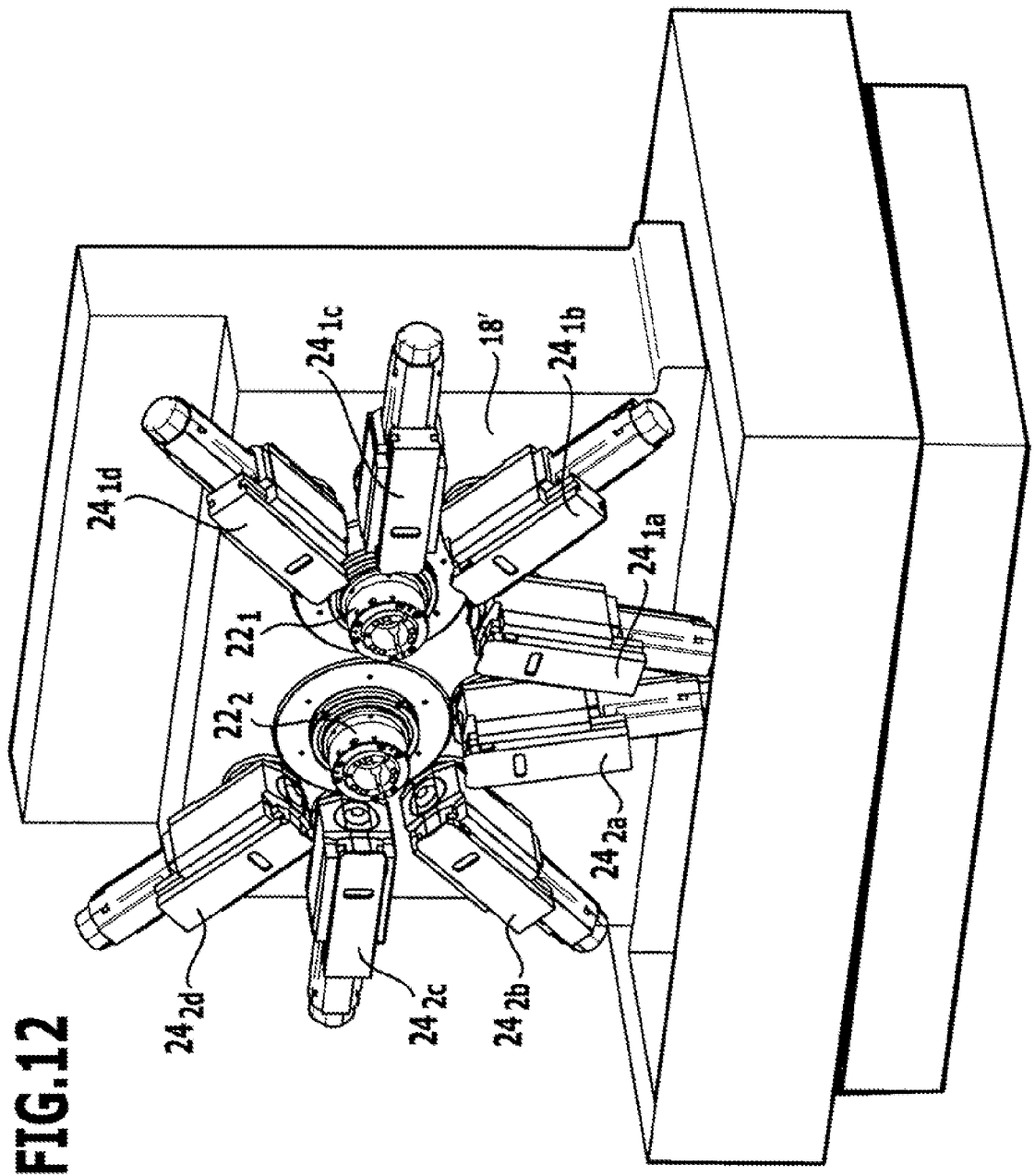
FIG. 12 shows an illustration similar to FIG. 4 of a fifth embodiment of a lathe according to the invention.
Figure 13:
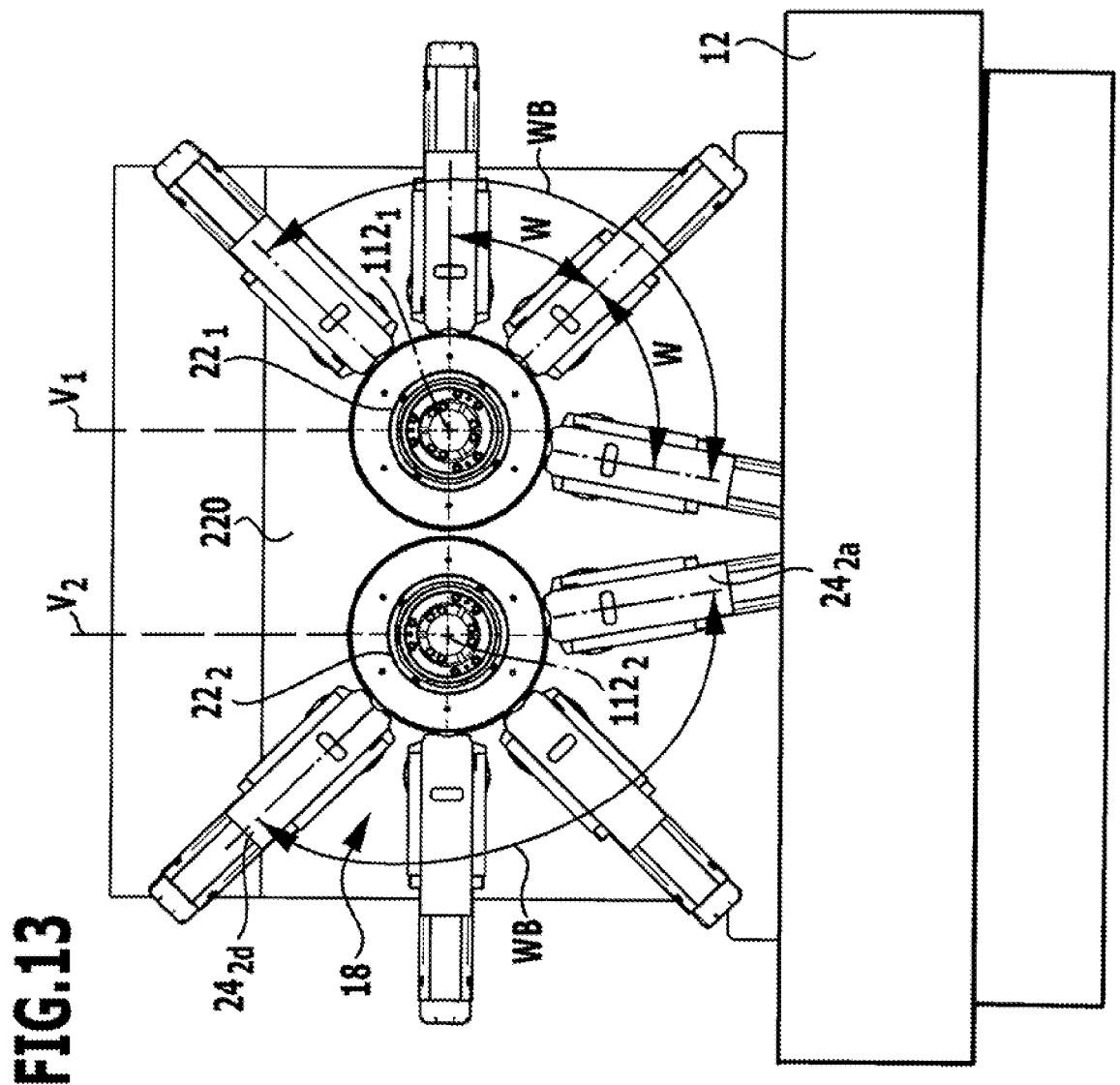
FIG. 13 shows a front view of the fifth embodiment of a lathe according to the invention.

In a further embodiment of a lathe according to the invention, illustrated in FIG. 12, two workpiece spindles $22_1$ and $22_2$ are provided in the upright housing member 18' and serve the purpose of machining workpieces. In this respect, the workpiece spindles $22_1$ and $22_2$ are arranged in such a manner that their spindle axes $112_1$ and $112_2$ extend essentially parallel to one another.

Furthermore, tool carriers $24_{1a}$ to $24_{1d}$ as well as $24_{2a}$ to $24_{2d}$ are associated with each of the workpiece spindles $22_1$ and $22_2$ and bear tools for the machining of the workpieces held in the workpiece spindles $22_1$ and $22_2$.

The tool carriers $24_{1a}$ to $24_{1d}$ as well as $24_{2a}$ to $24_{2d}$ are, in this respect, arranged in respective angular ranges WB which are in the order of magnitude of 150°, wherein the angular distances W between individual ones of the tool carriers $24_1$ or $24_2$ can either be the same or can vary but are always such that the tools of the individual tool carriers $24_1$ or $24_2$ can be used independently of one another on the workpieces in the respective workpiece spindles $24_1$ or $24_2$ independently of one another.

For example, the angular distances W between the tool carriers $24_{1b}$, $24_{1c}$ and $24_{1d}$ are approximately 45° each time whereas the angular distance W between the tool carrier $24_{1a}$ and the tool carrier $24_{1b}$ is approximately 60°.

Furthermore, the tool carriers $24_{1a}$ to $24_{1d}$ and $24_{2a}$ to $24_{2d}$ are arranged in such a manner that a free space 220 remains on a side of the workpiece spindles $22_1$ and $22_2$ located opposite the underframe 12 and this space corresponds at least to an intermediate space between two vertical planes $V_1$ and $V_2$ which extend through the spindle axes $112_1$ and $112_2$ so that it is, for example, possible to realize a supply of workpieces to the workpiece spindles $22_1$ and $22_2$ in the free space 220 between the vertical planes $V_1$ and $V_2$.

Figure 14:
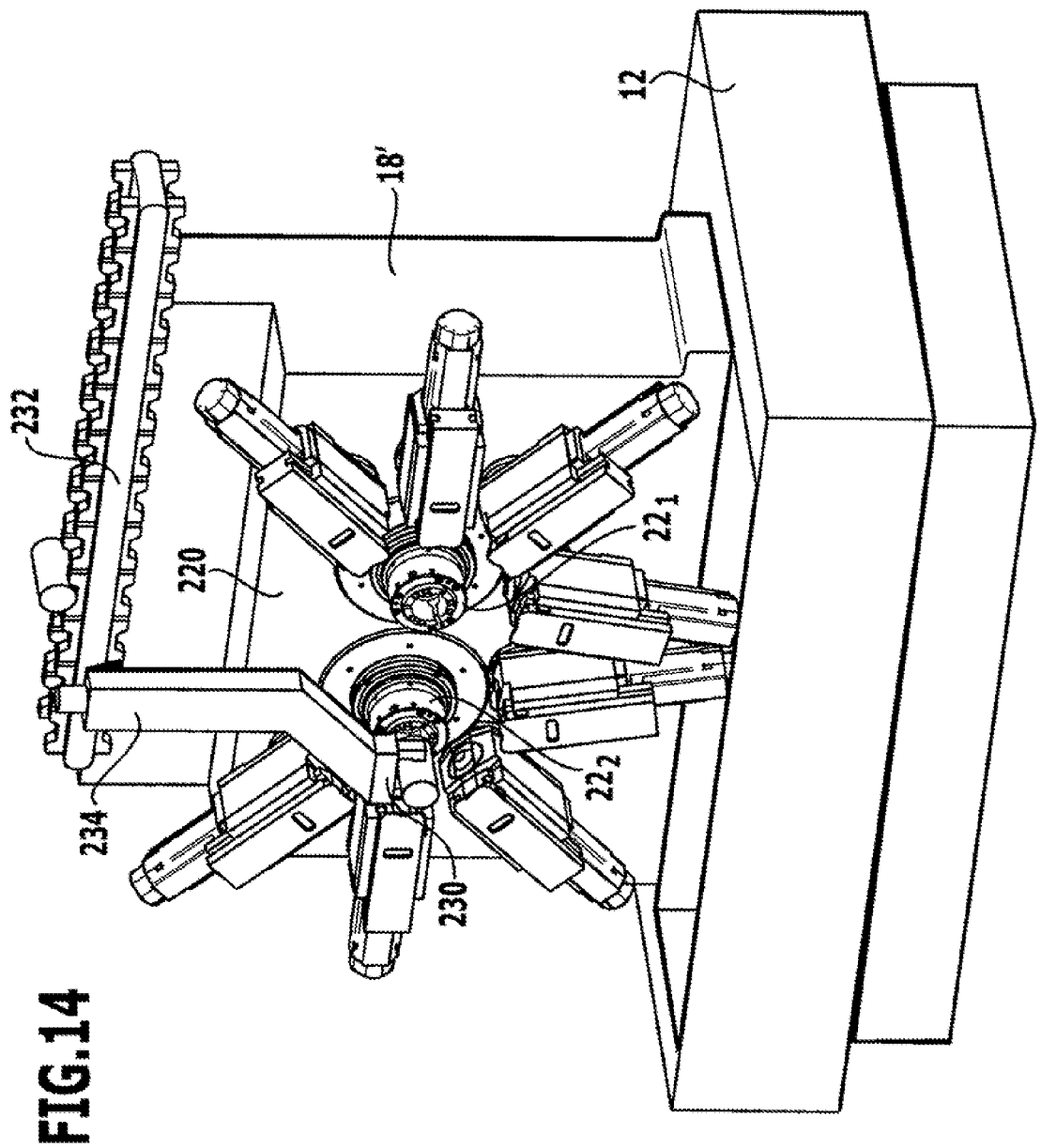
FIG. 14 shows an illustration similar to FIG. 12 of a sixth embodiment of a lathe according to the invention.

As realized in a sixth embodiment illustrated in FIG. 14, a workpiece gripping device 230 can be moved in the free space 220 and is in a position to remove workpieces from a workpiece supply device 232 and insert them into the workpiece spindles $22_1$ and $22_2$, respectively, or remove them from these spindles and transfer them again to the workpiece supply device 232 which, in this case, operates at the same time as a workpiece discharge device.

The workpiece gripping device 230 can, for its part, be held on an arm 234 which can be moved by optional devices.

Figure 15:
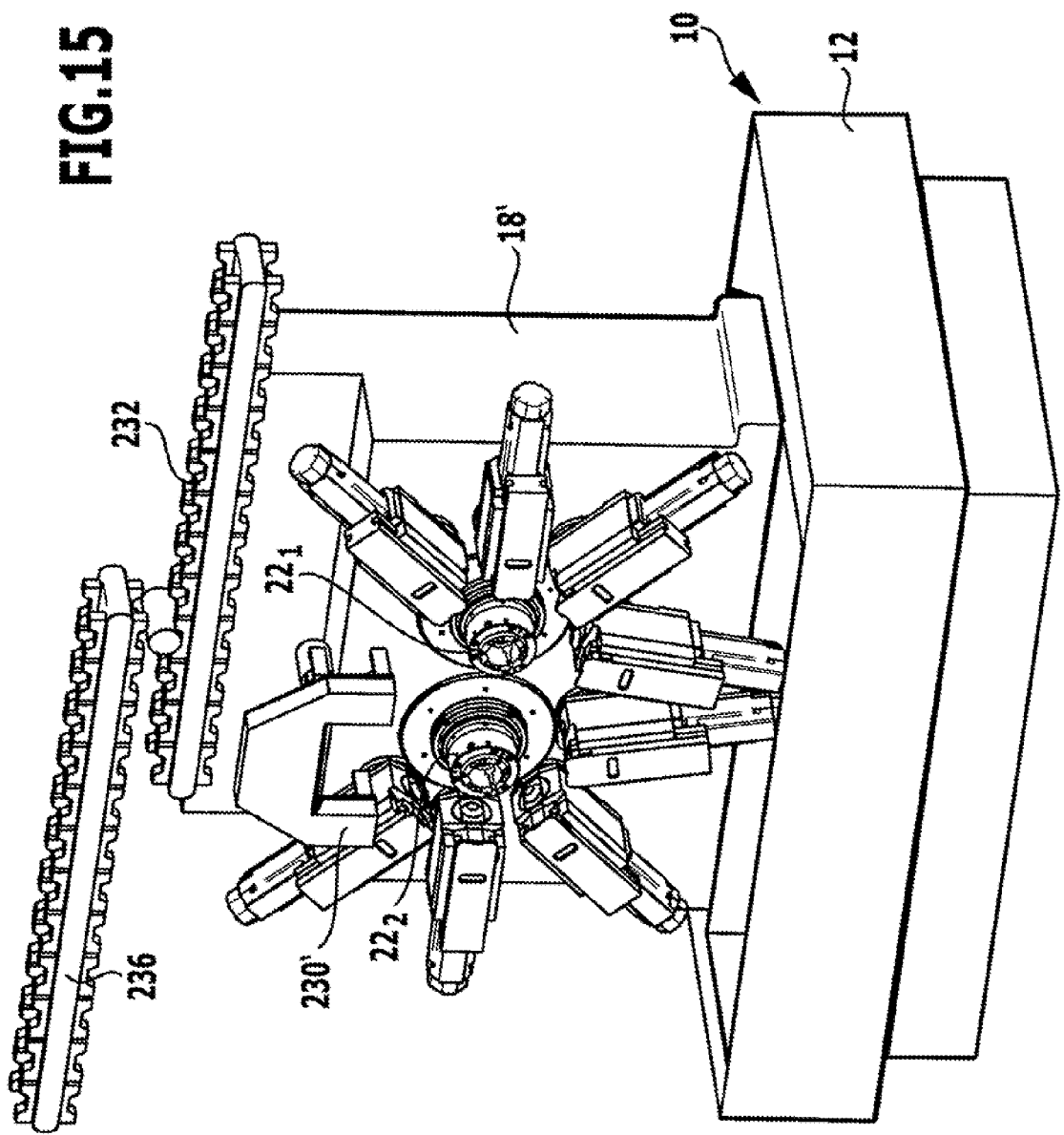
FIG. 15 shows an illustration similar to FIG. 12 of a seventh embodiment of a lathe according to the invention.

In a seventh embodiment, illustrated in FIG. 15, a multiple gripping device 230' is provided instead of a workpiece gripping device 230 and this interacts with the workpiece supply device 232 and an additional workpiece discharge device 236, wherein the multiple gripping device 230' is in a position to remove a workpiece from each of the workpiece spindles $22_1$ and $22_2$ at the same time and to hold the finished workpieces and then, prior to traveling to the workpiece supply device 232 and the workpiece discharge device 236, to insert an unmachined workpiece into the workpiece spindles $22_1$ and $22_2$ so that the workpiece gripping device 230' travels to the workpiece supply device 232 and the workpiece discharge device 236 only thereafter, wherein two unmachined workpieces can be removed from the workpiece supply device 232 again at the same time while the two finished workpieces can be deposited in the workpiece discharge device 236 at the same time.

Figure 16:
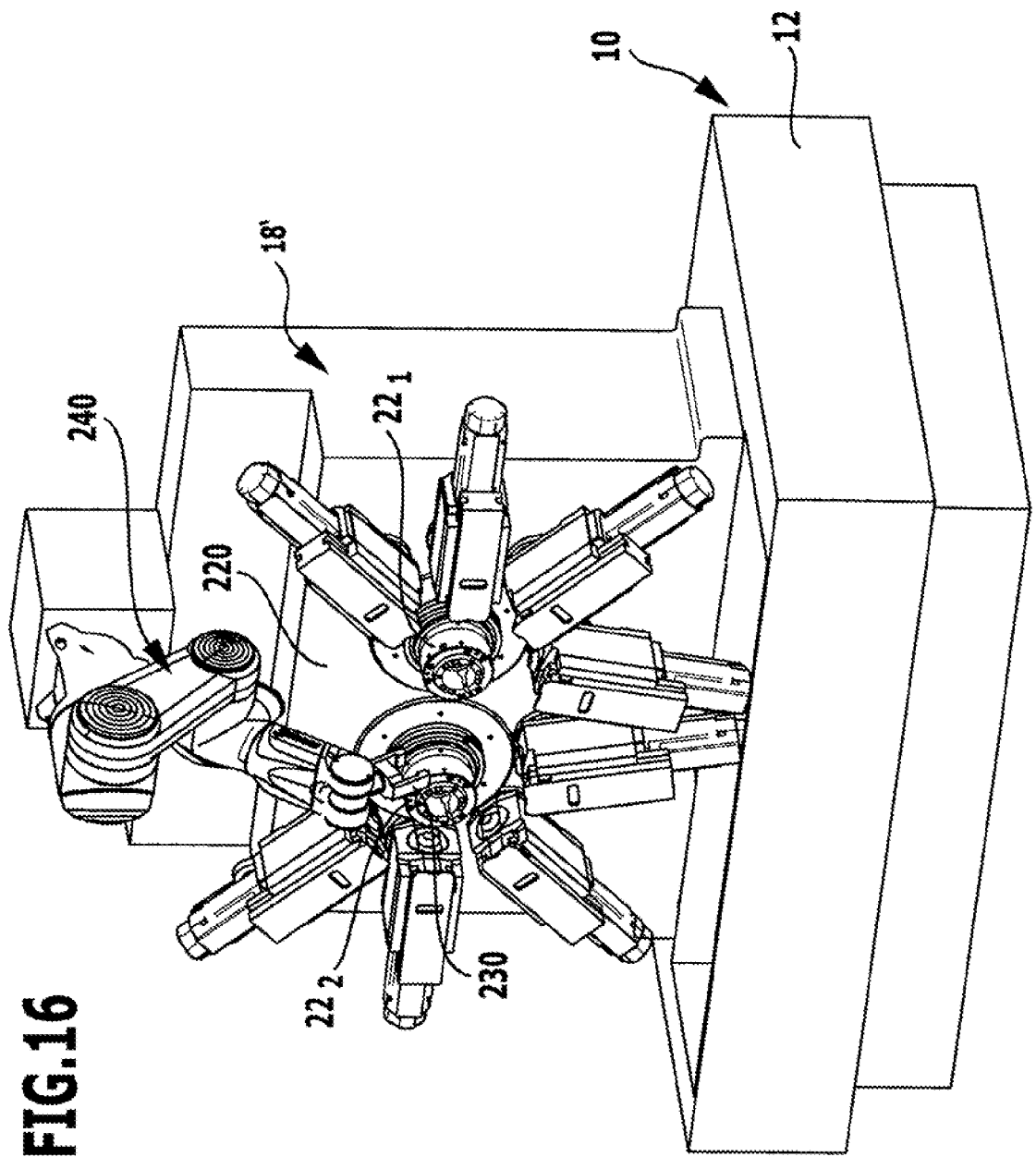
FIG. 16 shows an illustration similar to FIG. 12 of an eighth embodiment of a lathe according to the invention.
Figure 17:
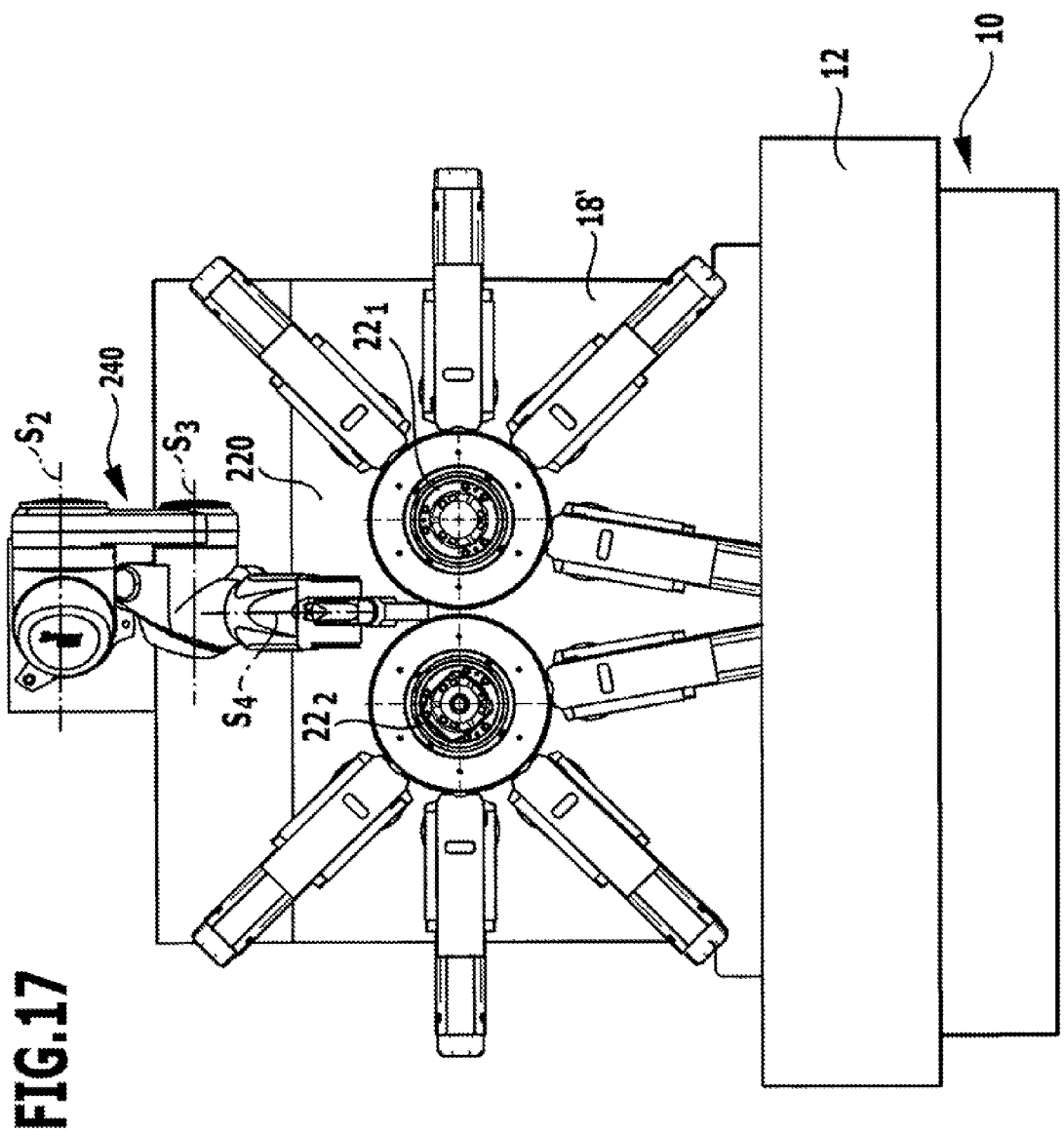
FIG. 17 shows a front view of the eighth embodiment of the lathe according to the invention.
Figure 18:
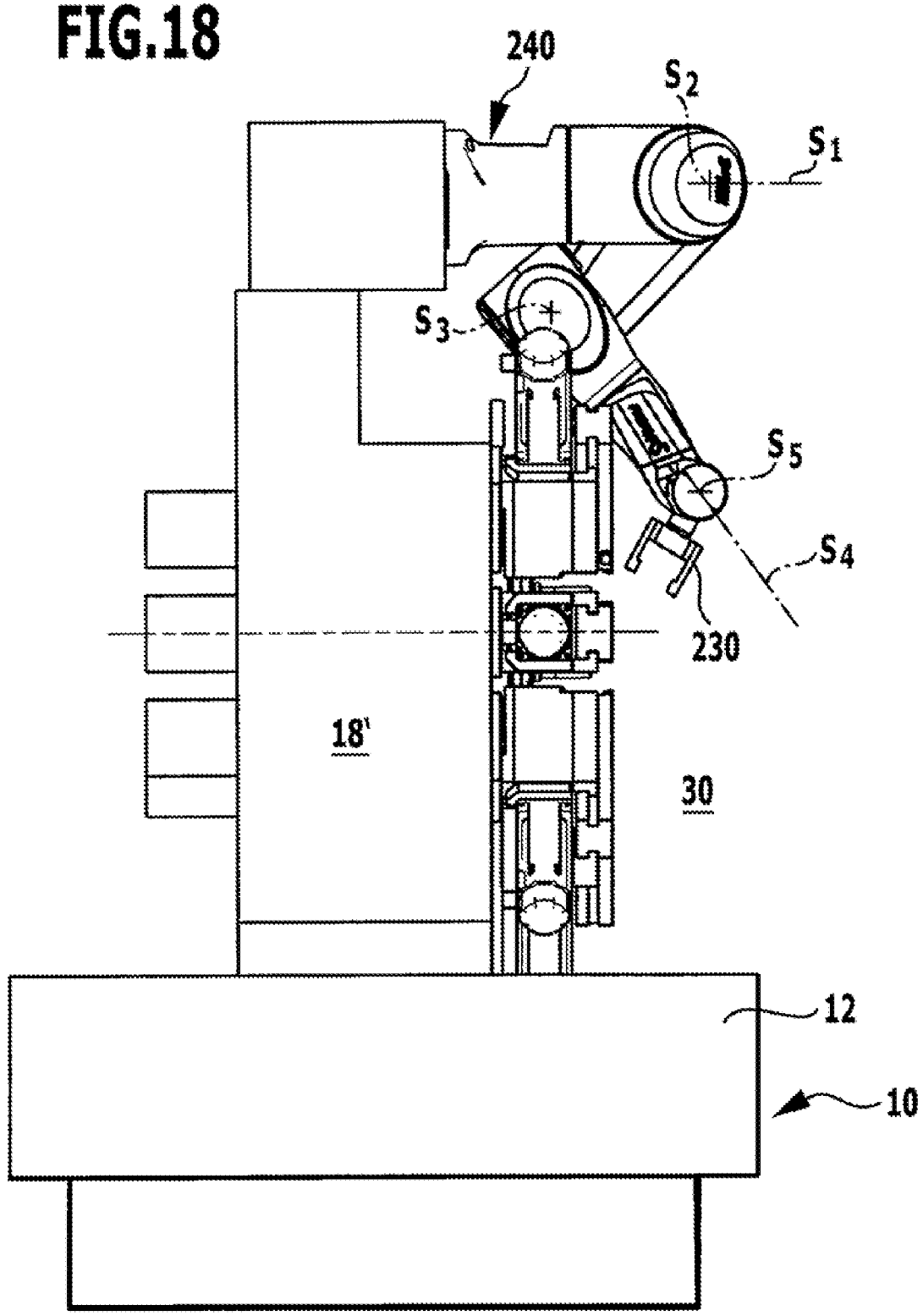
FIG. 18 shows a side view of the eighth embodiment of the lathe according to the invention.

In an eighth embodiment of a lathe according to the invention, illustrated in FIGS. 16 to 18, a pivot arm robot 240 is held on the upright housing member 18' and this is preferably arranged on a side of the upright housing member 18' located opposite the underframe 12 and is in a position, from a side located opposite the underframe 12, to access the workpiece spindles $22_1$ and $22_2$ with the gripping device 230, wherein the workpiece gripping device 20 can likewise preferably be moved over the free space 230.

The pivot arm robot 240 is realized as a buckling arm robot and has, altogether, five pivot axes $S_1$, $S_2$, $S_3$, $S_4$ and $S_5$, about which the workpiece gripping device 230 can be moved in order to grip workpieces in both workpiece spindles $22_1$ and $22_2$ and be able to remove them from these spindles or insert them into them, wherein such a pivot arm robot 240 is used in a manner interacting with a suitable workpiece supply device which is not illustrated in the drawings and a suitable workpiece discharge device.

Figure 19:
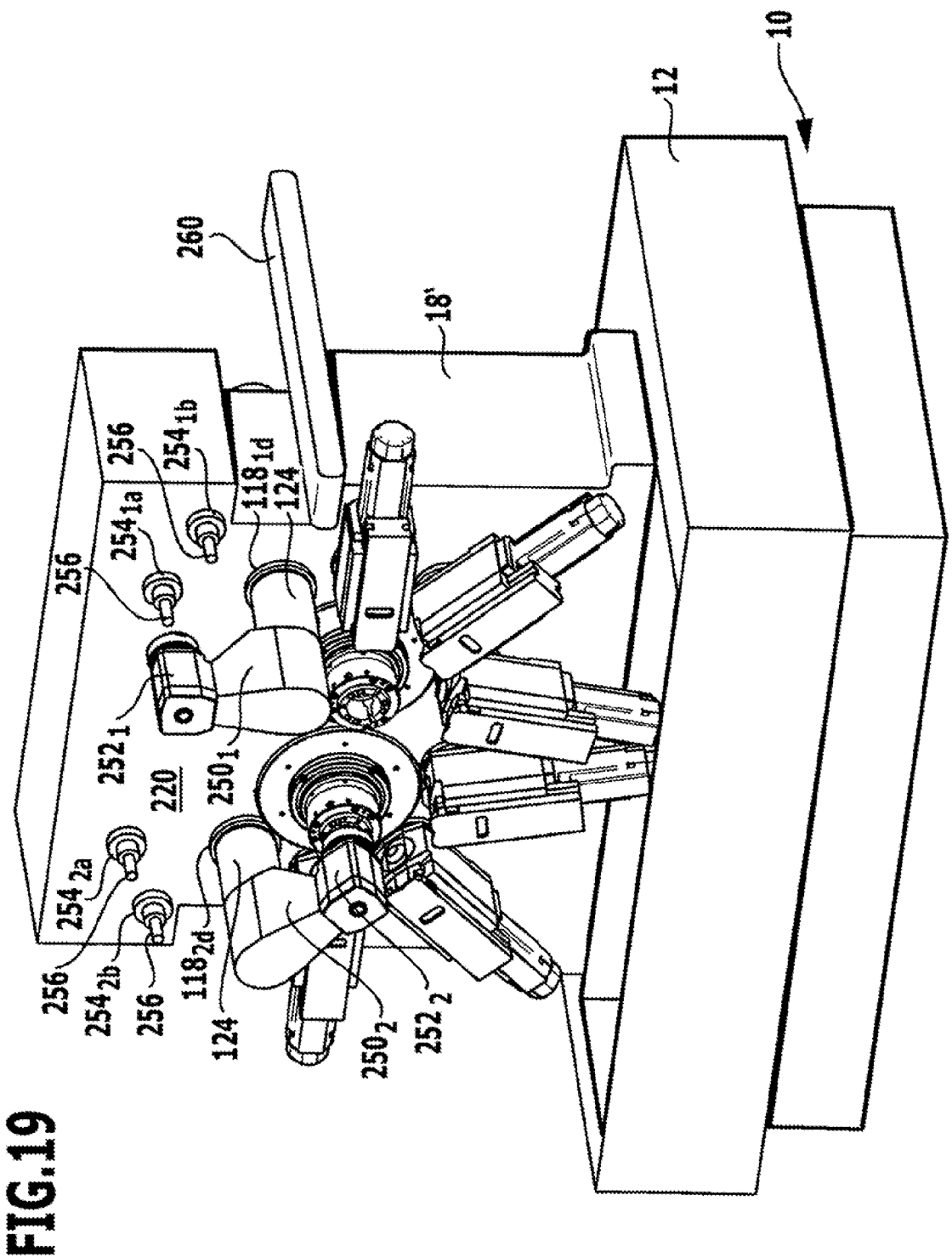
FIG. 19 shows an illustration similar to FIG. 12 of a ninth embodiment of a lathe according to the invention.

In a ninth embodiment, illustrated in FIG. 19, pivot arms $250_1$ and $250_2$ are provided on the guiding members 124 in the corresponding receptacles $118_{1d}$ and $118_{2d}$ on the upright housing member 18' instead of the tool carriers $24_{1d}$ and $24_{2d}$ and bear workpiece spindles $252_1$ and $252_2$ on their end sides, wherein these workpiece spindles $252_1$ and $252_2$ can be brought as a result of pivoting of the pivot arms $250_1$ and $250_2$, respectively, into positions which are coaxial to the workpiece spindles $22_1$ and $22_2$ in order to—as is known in conjunction with the front and rear side machining by way of counter spindles—take up from the workpiece spindles $22_1$ and $22_2$ workpieces, which have been machined on one side, on the machined front side, remove them and bring them as a result of pivoting of the pivot arms $250_1$ and $250_2$, respectively, into positions, in which a rear side machining with tool carriers $254_{1a}$ and $254_{1b}$ or $254_{2a}$ and $254_{2b}$ provided stationarily on the upright housing member can be carried out, wherein the tool carriers $254_{1a}$ and $254_{1b}$ or $254_{2a}$ and $254_{2b}$ are each arranged on the upright housing member 18' such that their tools 256 can be brought into use as a result of different rotary positions of the pivot arms $250_1$ and $250_2$, respectively, relative to the upright housing member 18'.

The counter spindles $250_1$ and $250_2$, respectively, can thus be used for the purpose of removing workpieces, which have been machined on one side, from the workpiece spindles $22_1$ and $22_2$, machining them again on the rear side by means of the tools 256 as a result of respectively different rotary positions of the pivot arms $250_1$ and $250_2$, respectively, and depositing the finished workpieces on a workpiece discharge device 260 which transports away the finished workpieces.

Figure 20:
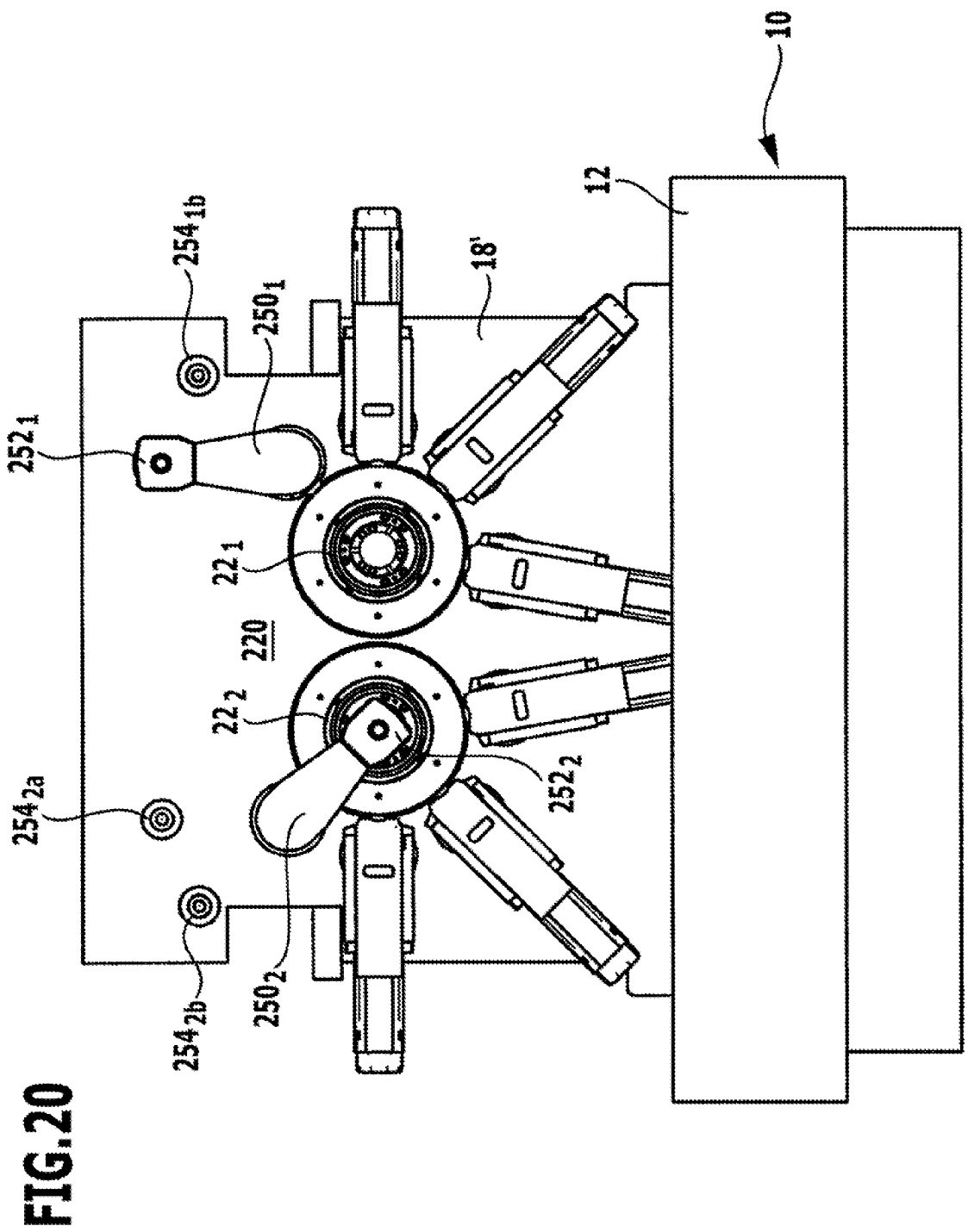
FIG. 20 shows a front view of the ninth embodiment of the lathe according to the invention and FIG. 21 shows a side view of the ninth embodiment of the lathe according to the invention.
Figure 21:
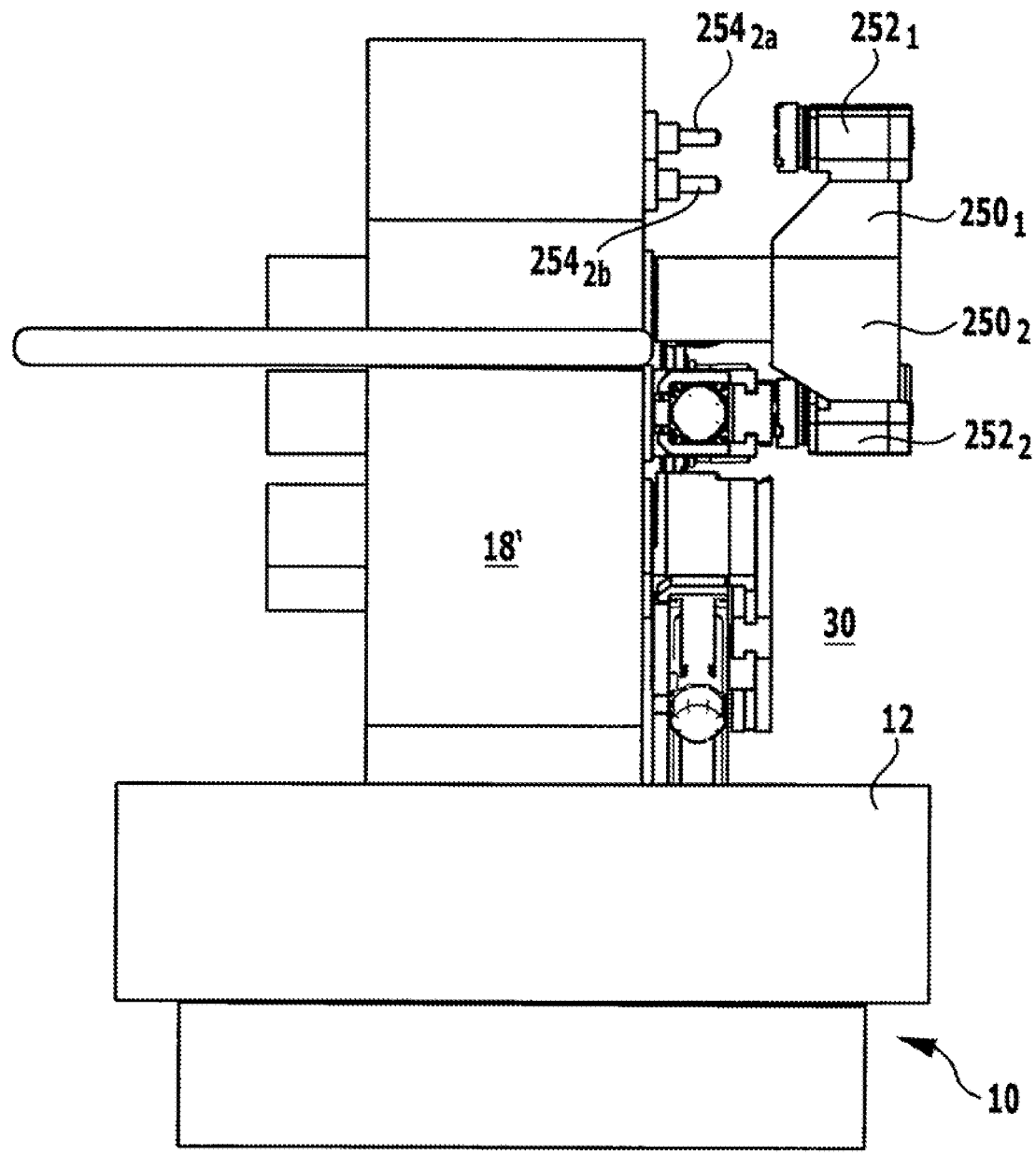

The possibility of a front and rear side machining of workpieces is thus created with the lathe according to FIG. 19 and FIG. 20 and this combines all the advantages of the embodiments of the solution according to the invention described thus far.

The invention claimed is:

1. Lathe comprising a machine frame, an upright housing member arranged on one side of a working space and bordering said working space and on which several functional units are arranged, a workpiece spindle rotatable about a spindle axis arranged in said upright housing said workpiece spindle comprising a spindle motor, the stator of said spindle motor being stationary held in a passage of the upright housing member, such that a central area of said upright housing member is designed as a spindle housing member, as well as at least one functional unit designed as a tool carrier and/or as a workpiece transport device; and wherein functional units with functional elements movable approximately parallel to the spindle axis have guiding members extending approximately parallel to the spindle axis and being guided in a guide for the guiding members provided in the upright housing member so as to be movable approximately parallel to the spindle axis.

2. Lathe as defined in claim 1, wherein the upright housing member is arranged stationarily on the machine frame.

3. Lathe as defined in claim 1, wherein the upright housing member is designed as an upright housing block arranged on an underframe of the machine frame.

4. Lathe as defined in claim 1, wherein transversely to the spindle axis the upright housing member has an extension corresponding to at least a diameter of the spindle motor transversely to the spindle axis.

5. Lathe as defined in claim 1, wherein at least three functional units are arranged on the upright housing member, said functional units having functional elements movable relative to the workpiece spindle and displaceable on respective functional paths.

6. Lathe as defined in claim 5, wherein at least four functional units are provided on the upright housing member, said functional units having functional elements movable relative to the workpiece spindle and displaceable on respective functional paths.

7. Lathe as defined in claim 5, wherein the functional elements are movable on functional paths respectively different from one another.

8. Lathe as defined in claim 5, wherein the functional paths of at least some of the functional elements extend relative to one another without crossing.

9. Lathe as defined in claim 8, wherein the functional paths of all the functional elements extend relative to one another without crossing.

10. Lathe as defined in claim 5, wherein the functional paths of at least some of the functional elements extend relative to one another without touching.

11. Lathe as defined in claim 10, wherein the functional paths of all the functional elements extend relative to one another without touching.

12. Lathe as defined in claim 5, wherein at least some of the functional paths are realizable with a component extending transversely to the spindle axis.

13. Lathe as defined in claim 5, wherein at least some of the functional paths are realizable with a component extending approximately parallel to the spindle axis.

14. Lathe as defined in claim 5, wherein at least some of the functional elements are arranged so as to be movable independently of one another.

15. Lathe as defined in claim 14, wherein functional elements designed as tools of different functional units designed as tool carriers are arranged so as to be mechanically movable independently of one another.

16. Lathe as defined in claim 15, wherein the tools are movable only on functional paths allowing a collision-free movement of the tools relative to one another.

17. Lathe as defined in claim 15, wherein the tools are movable only on functional paths allowing a collision-free movement of the tools relative to the machine frame.

18. Lathe as defined in claim 1, wherein all the functional units provided for machining workpieces in the working space are arranged on the upright housing member.

19. Lathe as defined in claim 1, wherein the several functional units are arranged around the spindle axis on the upright housing member.

20. Lathe as defined in claim 19, wherein the several functional units are arranged around the spindle axis in an arc segment extending over an angular area of at least 90°.

* * * * *